United States Patent [19]

Ragle et al.

[11] 4,129,891
[45] * Dec. 12, 1978

[54] DOUBLE PARTITIONING OF FLEXIBLE DISK PACK AND ASSOCIATED APPARATUS

[75] Inventors: Herbert U. Ragle, Thousand Oaks; Dean DeMoss, Camarillo, both of Calif.

[73] Assignee: Burroughs Corporation, Detroit, Mich.

[*] Notice: The portion of the term of this patent subsequent to Apr. 25, 1995, has been disclaimed.

[21] Appl. No.: 792,589

[22] Filed: May 2, 1977

Related U.S. Application Data

[63] Continuation-in-part of Ser. No. 766,288, Feb. 7, 1977, which is a continuation-in-part of Ser. No. 720,905, Sep. 7, 1976.

[51] Int. Cl.² ..................... G11B 23/02; G11B 25/04
[52] U.S. Cl. .......................... 360/98; 360/99; 360/133
[58] Field of Search ............................ 360/97–99, 360/133, 135; 206/444; 346/134, 137; 209/80.5, 110.5; 40/152.2, 158 B; 358/128

[56] References Cited

U.S. PATENT DOCUMENTS

| 1,360,617 | 11/1920 | Brand | 209/110.5 |
| 3,931,644 | 1/1976 | Ward | 360/99 X |
| 3,947,885 | 3/1976 | McGinnis et al. | 360/98 |

OTHER PUBLICATIONS

IBM Technical Disclosure Bulletin, vol. 19, No. 1, Jun. 1976, p. 171.

Primary Examiner—John H. Wolff
Attorney, Agent, or Firm—John J. McCormack; Nathan Cass; Kevin R. Peterson

[57] ABSTRACT

Improved for subassembly partitioning, particularly as adapted for inclusion in disk drive apparatus for handling flexible disk packs, these packs preferably comprising flexible hole-encoded, disks compactly stacked in contiguous, superposed registration and packaged in a protective jacket; the subassembly, in one preferred embodiment, comprising a pair of double, nested separator-plungers, each pair being adapted to operate through the encoded hole pattern to selectively and automatically partition the disk pack as well as "center" a selected disk, thereby enabling the associated entry and manipulation of a double-opposed transducer assembly into the pack, enveloping the so-centered disk.

18 Claims, 32 Drawing Figures

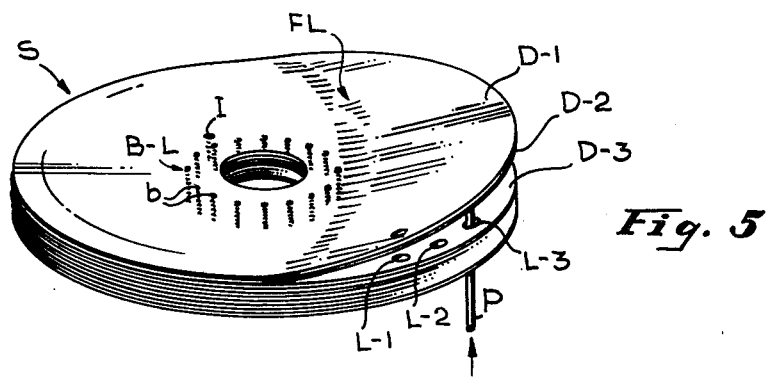
Fig. 5
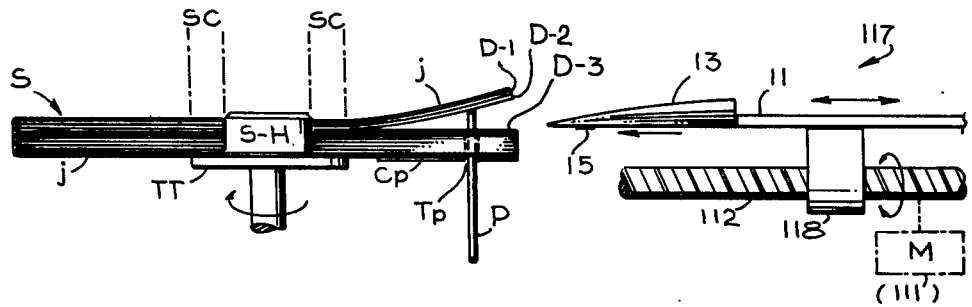
Fig. 6
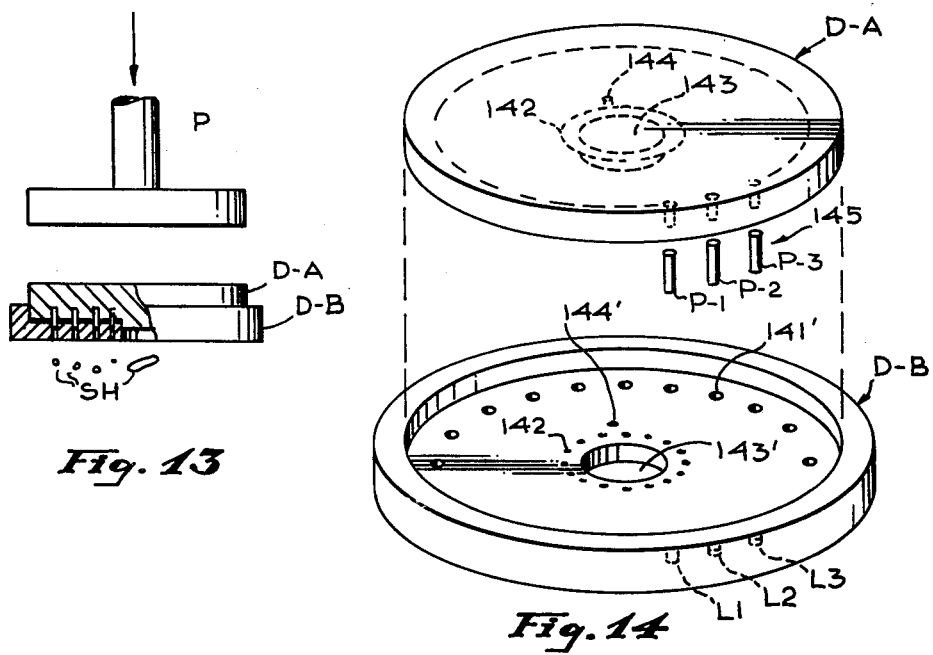
Fig. 13
Fig. 14

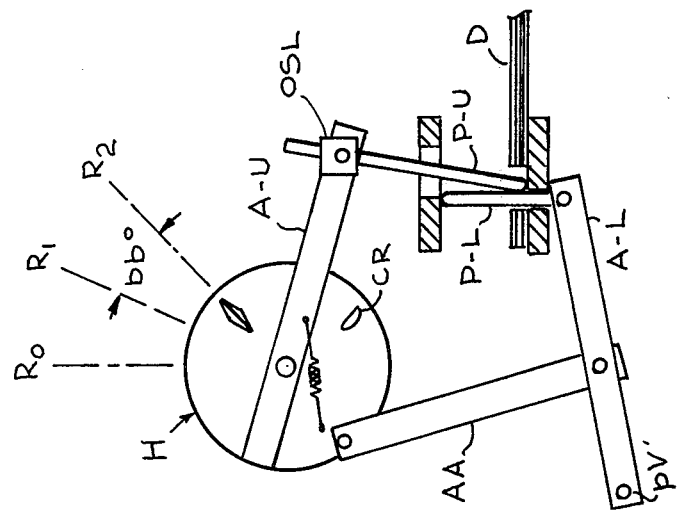
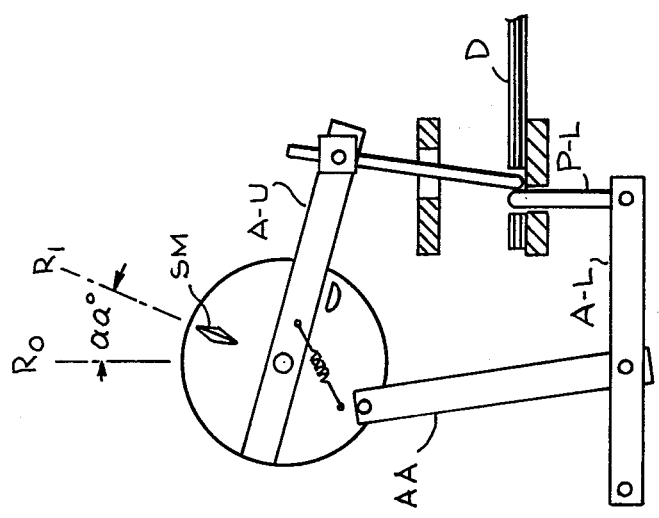
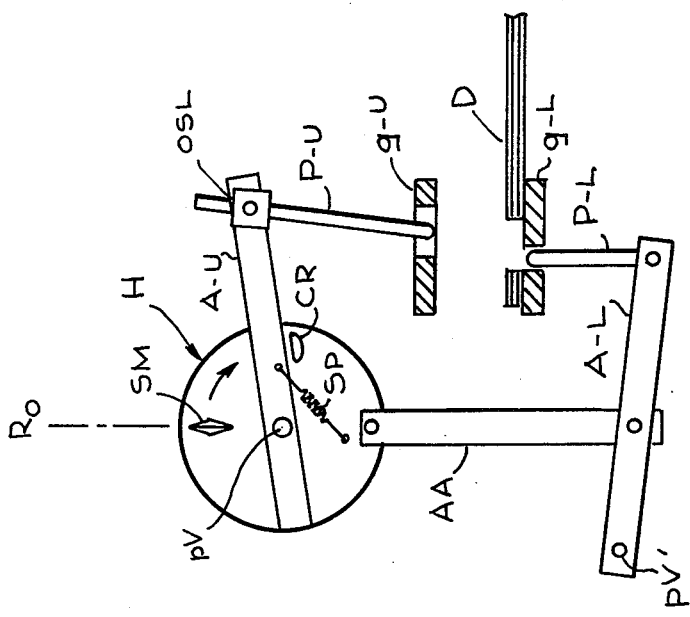
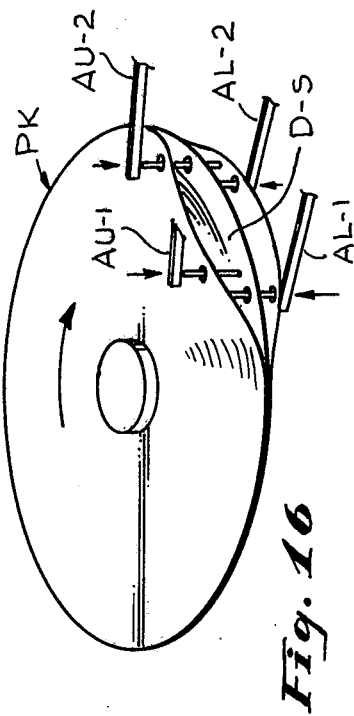
Fig. 15-C
Fig. 15-B
Fig. 15-A
Fig. 16

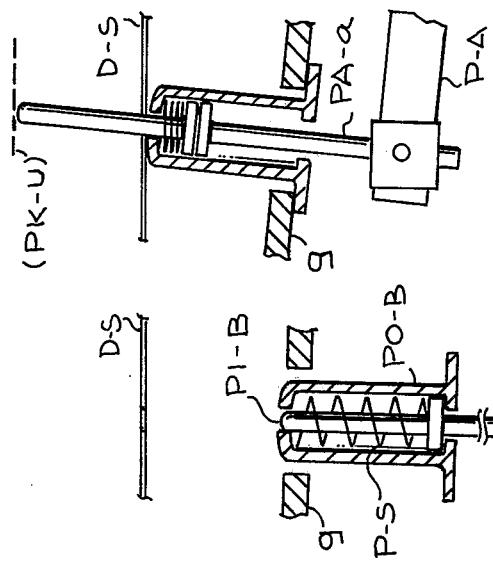
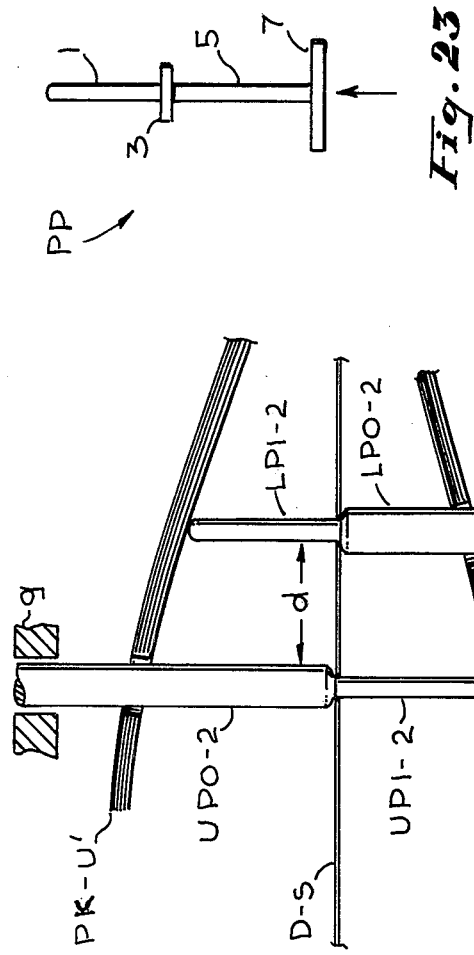
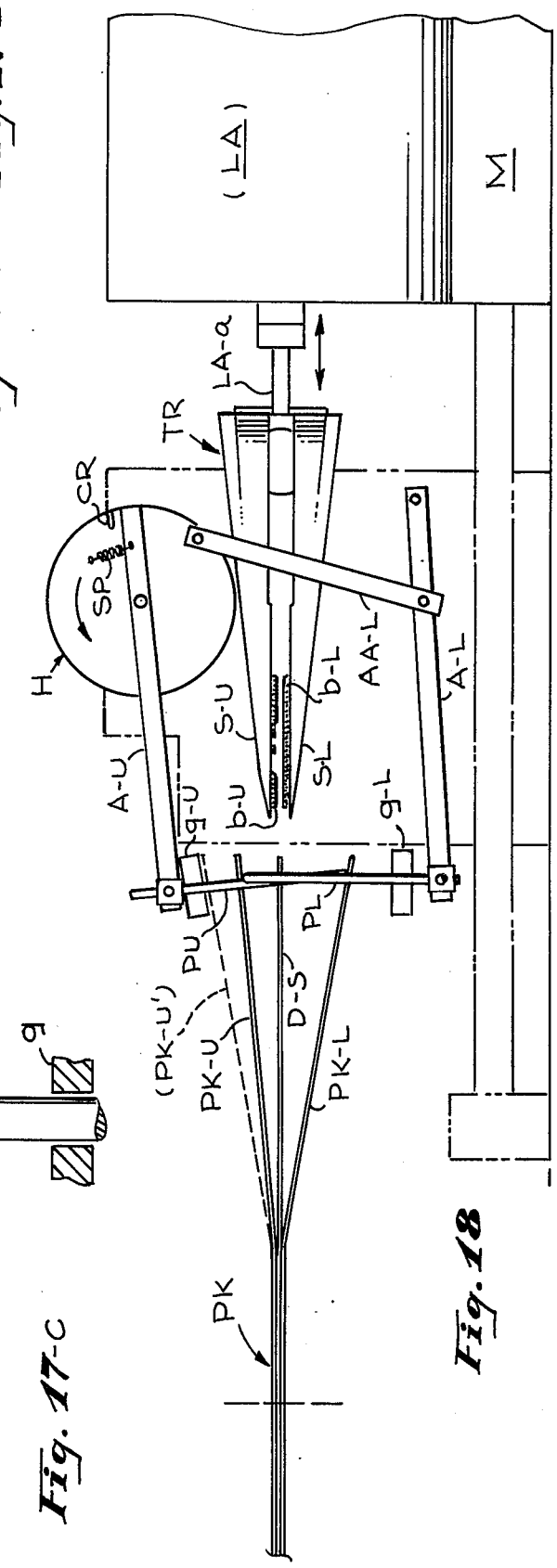

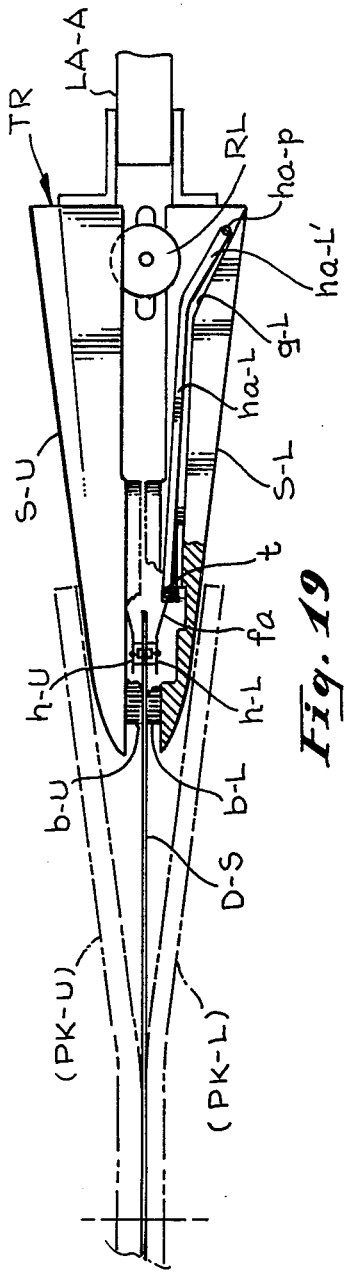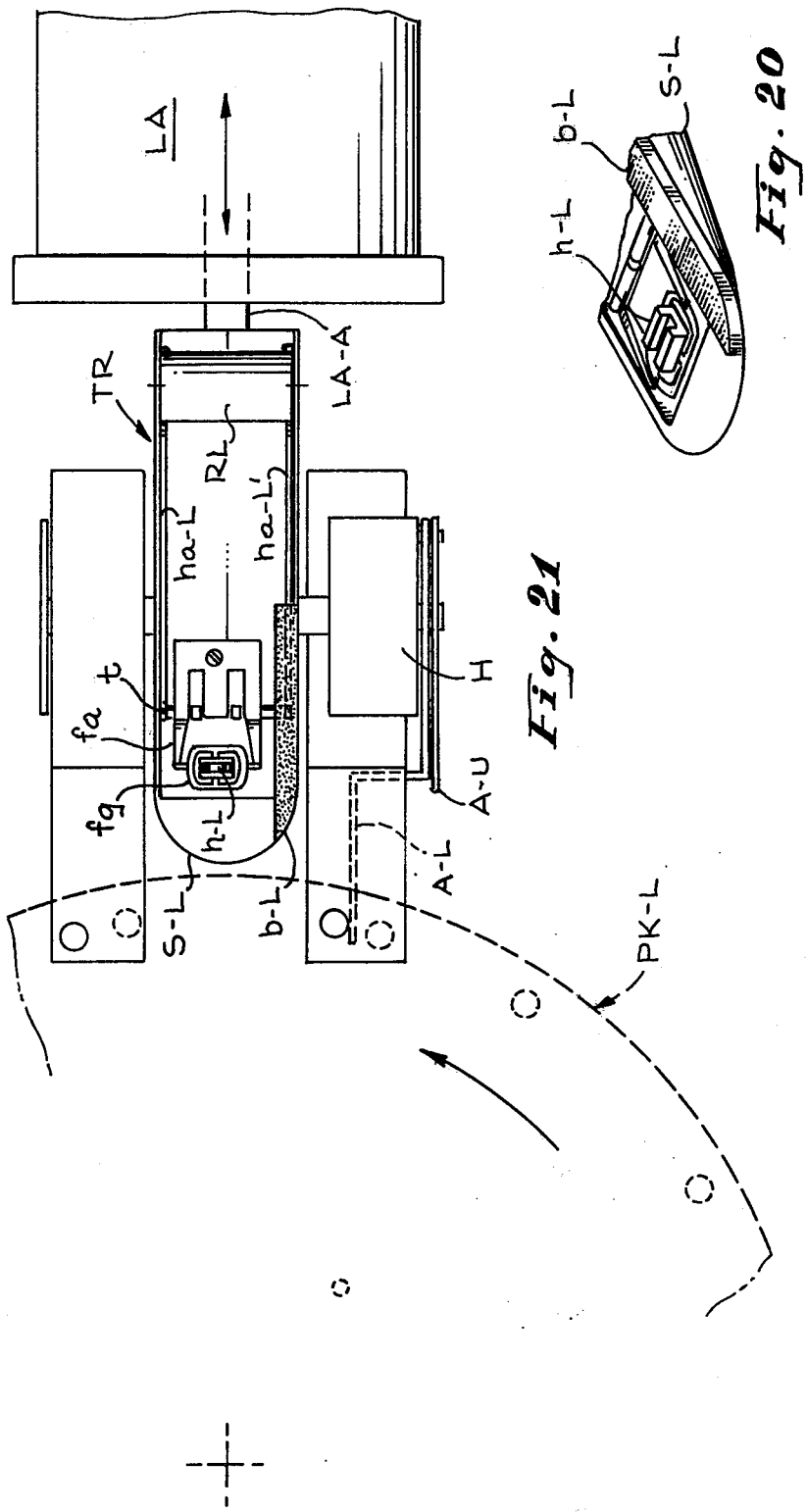

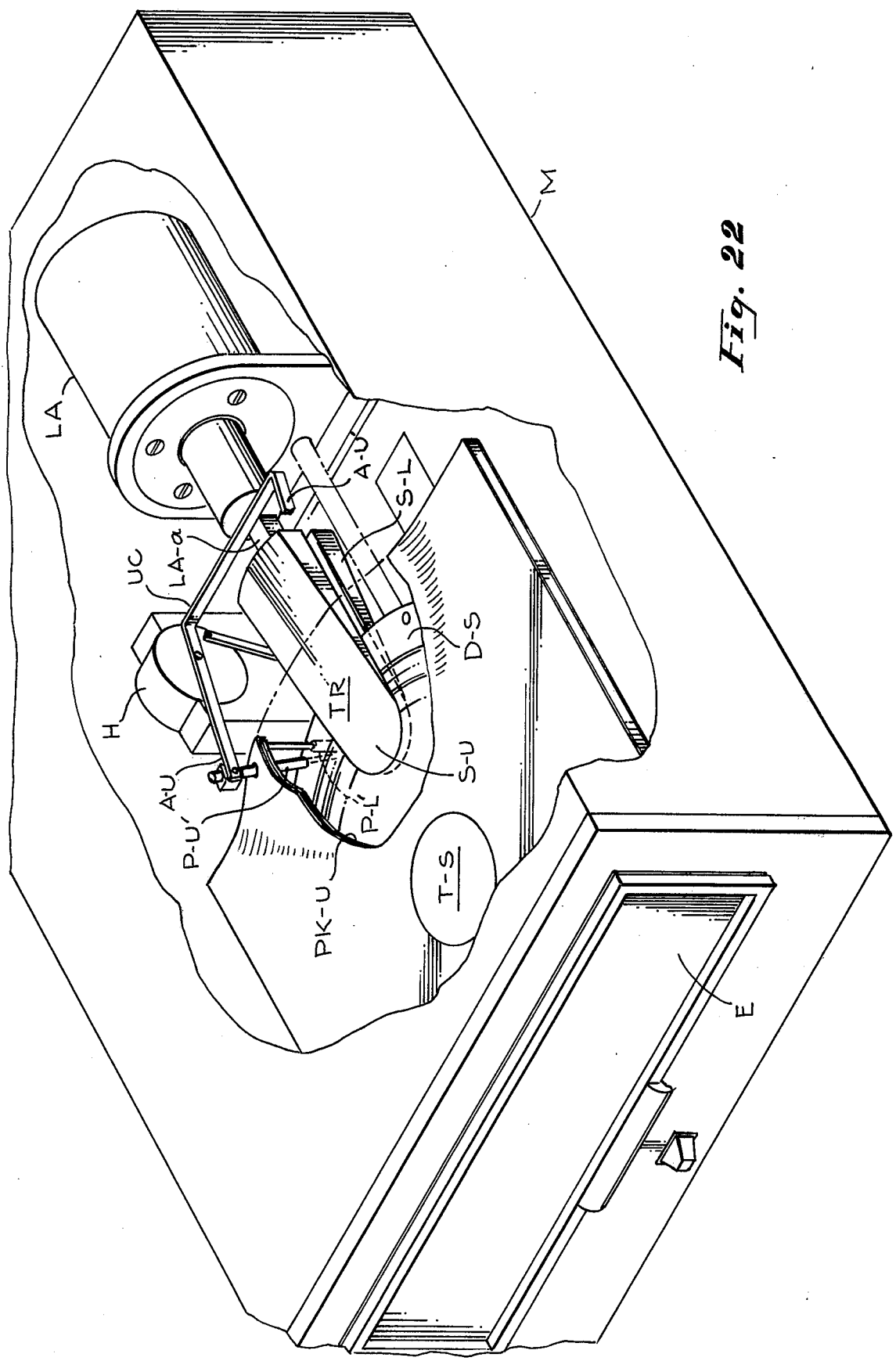

DOUBLE PARTITIONING OF FLEXIBLE DISK PACK AND ASSOCIATED APPARATUS

This application is a continuation-in-part of our commonly assigned U.S. patent application, Ser. No. 766,288 filed Feb. 7, 1977 for "Improved Partitionable Disk Pack"; which is, in turn, a continuation-in-part of our Ser. No. 720,905 filed Sept. 7, 1976, for "Means and Methods for Partitionable Flexible Disk Packs", also commonly assigned.

These and the following commonly assigned recently filed patent applications are related to the subject matter of this application and are herewith incorporated by reference.

Ser. No. 711,647, filed: Aug. 4, 1976
Ser. No. 711,579, filed: Aug. 4, 1976
Ser. No. 711,628, filed: Aug. 4, 1976
Ser. No. 720,910, filed: Sept. 7, 1976

BACKGROUND AND FEATURES OF THE INVENTION

This invention relates to apparatus for handling disk recording media and in particular to novel improved methods and apparatus for partitioning "disk packs", especially for double-sided transducer operation.

Workers in the data recording and related record handling arts are cognizant of today's advanced state of the art; e.g., in improved disk recording media and associated record handling equipment. Such equipment is now widely used, especially in the form of "flexible or "floppy" disks. The present invention is intended to supplement improved disk handling equipment adapted to handle packs of such flexible disk media, providing improved means to separate and partition the disks from one another.

Workers are well aware that, along with their advantages, "floppy disk" media have long presented certain problems. Some workers have despaired of finding any simple, practical means of accessing individual selected recording surfaces in a "floppy disk pack" in the precise, rapid, repeatable manner that is typically required—this principally because a floppy substrate seemed so difficult to hold in position and stabilize. And it is not surprising that workers have anticipated tremendous difficulties in precisely positioning a Read/-Write head between tissue-thin floppy disks' separated by no more than a few mils, let alone doing so quickly and simply. This invention facilitates such operation in an improved partition arrangement and associated technique. The invention is intended to provide means, with associated "floppy pack" processing equipment which is adapted to automatically partition a stack of disks and give good access to a transducer assembly, etc. The invention is especially adapted to give access to double-sided transducer assemblies, isolating a "selected" disk from the rest of the pack, both top and bottom—and doing so with automatic equipment which is relatively simple, yet cost-effective, while presenting no danger of damaging the thin fragile disks.

The present invention is particularly designed to accommodate a pack of hole-encoded disks, (as described in the above-cited applications) as well as the positioning manipulations associated therewith—more specifically, to provide pack-partitioning plunger means, and disk selection and transducer access with automatic equipment. The present invention overcomes the foregoing and other disadvantages of prior art structures and methods and provides the mentioned and other features and advantages according to a novel design.

More particularly, this invention teaches techniques and associated means for effecting one, or more, "double-partitioning" of a flexible disk pack; preferably in conjunction with means for holding an intermediate "selected" disk centered in the partition-gap for prescribed transducer-access to both disk sides; the associated means preferably involving (at least) two pairs of opposed "telescoping-plunger" arrays, with each plunger adapted to project an outer "centering" shaft and an inner deflecting shaft—these being adapted for admission through disks provided with associated "double-arrays" of partition holes, each array comprised of a first set for admission of these outer shafts and an associated second set for admission of the inner shafts-only. A common rotary-hub actuator mechanism is also preferably provided to actuate each opposed array of plungers in prescribed synchronism.

The foregoing and other features, objects and advantages, according to the present invention will be more fully appreciated and become more apparent from consideration of the following description of preferred embodiments of the invention, taken in conjunction with the attached drawings wherein like reference symbols denote like parts.

BRIEF DESCRIPTION OF THE DRAWINGS

FIGS. 1-14 duplicated those of the cited applications; i.e.

FIGS. 1 and 2 are schematic plan views of a prior art flexible disk and an associated prior art jacket, respectively;

FIG. 3 is a diagrammatic plan view of a flexible disk modified with a hole-encoding pattern according to the invention, while

FIG. 4 is a schematic diagram of a flexible disk pack embodiment according to the invention, with exemplary disks therein shown exploded-away for illustrative purposes;

FIG. 5 is a schematic side perspective of the disk pack embodiment of FIG. 4 inter-acting with associated pack-partitioning means; while FIG. 6 indicates a side view of such an arrangement in operative relation combination with a turntable and an associated transducer carriage assembly.

FIG. 7 is a plan view of an improved protective jacket, especially adapted for disk packs like those in FIGS. 4 and 5, while FIG. 8 shows this jacket in inverted perspective view and disposed in illustrative operative relation with schematically indicated opening means and partitioning means;

FIG. 9 is a front perspective view of a "disk drive" adapted for handling disk pack media like the embodiment of FIGS. 4 and 5, as housed in a protective jacket like that in FIGS. 7 and 8, while FIG. 10 is an enlarged close-up view of working elements of this drive, with certain superstructure broken-away for clarity of illustration;

FIG. 11 is a schematic side view of a pack partitioning arrangement adapted for use with disk packs like those in FIGS. 4, 5 and particularly adapted for inclusion in a flexible disk drive like that of FIGS. 9 and 10;

while FIG. 12 is a similar view of an automatic jacket opening means likewise adapted for such a disk pack and suited for incorporation in such a drive; and FIG. 14 is a schematic perspective view of a pair of mating disk-forming dies adapted to form hole-encoded disks of the type indicated in FIG. 3, these dies being shown in schematic operative relation in the side view of FIG. 13.

FIG. 15A is a schematic side view of a "double plunger" actuator embodiment in a first ("rest") condition, while FIGS. 15B and 15C show the elements in "partial-activation" and "full-activation" conditions, respectively;

FIG. 16 is an upper perspective showing, simplified and idealized, of a combined "double-partitioning" and "centering" of flexible disks; with one pair of associated bi-part plungers being shown in enlarged side sectional view in FIG. 17;

FIGS. 17a, b, and c showing a related modified plunger in "retracted" and "extended" condition, respectively; while FIG. 23 shows a further plunger modification.

FIG. 18 is a schematic side view of such a partition centering operation as carried-out with a pair of plungers and common actuator means (like that in FIGS. 15) and associated "two-sided" transducer arrangement; the transducer arrangement being shown injected into the pack in FIG. 19, an enlarged side-view; and with FIG. 20 illustrating, in upper fragmentary perspective, one of the transducer mount portions; while FIG. 21 is a schematic plan view of one-half of the transducer mounts in operative relation with linear actuator means and;

FIG. 22 shows a partial perspective view of a related disc drive after the manner of FIG. 9.

DETAILED DESCRIPTION OF PREFERRED EMBODIMENTS

Flexible Disks, in General

Figure 3:
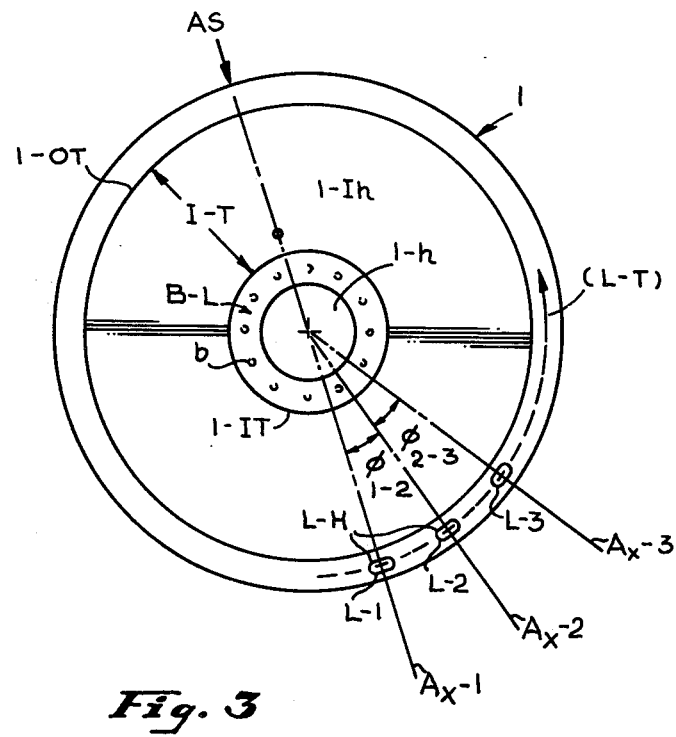
Figure 4:
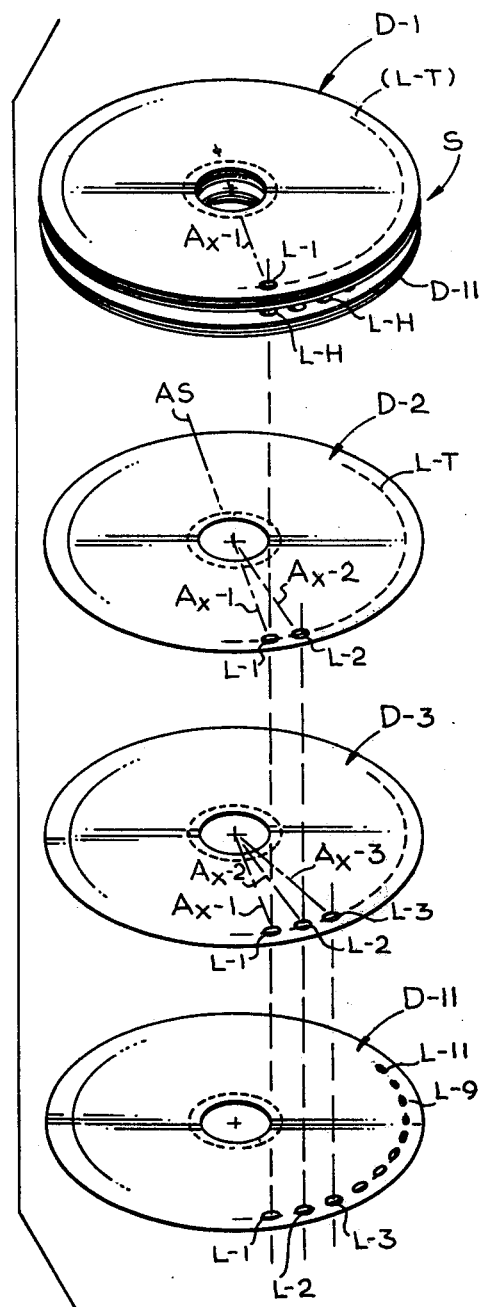

FIG. 3 schematically illustrates a preferred embodiment 1 of a flexible (pliant or "floppy" type) disk record adapted, according to the invention, to be stacked with other like record disks, into a pack as indicated at disk file or stack S in FIGS. 4 and 5. These disks are, as a group and according to the invention, encoded and arranged to be manipulated as a group for the selectable partitioning, or splitting, of the stack adjacent any selected disk surface. This is basically accomplished in accordance with the invention by providing the stacked disks with an encoded arrangement of apertures such that a plurality of unique unobstructed paths are provided (e.g., by differently aperturing or differently disposing each disk in a stack) from at least one end of the stack respectively terminating at the surfaces of successive disks. A thrusting force applied along a selected one of these unobstructed paths will then cause the stack to be flexed open between a corresponding pair of adjacent disks in the stack. In the preferred embodiments considered herein, this is controlled according to the circumferential position assumed by the pack relative to an associated disk engaging means as described hereinafter.

Figure 1:
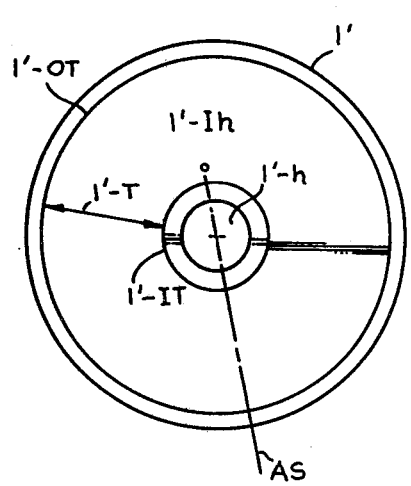

It is instructive to first consider the design and construction of a relatively conventional floppy disk design 1' as indicated in the prior art FIG. 1. Thus, prior art disk 1' may be understood as a well known "industry-compatible" type of flexible disk particularly adapted for employment as a unit magnetic data record. Such a disk record will be recognized as comprising a circular flexible substrate of polyethylene terephthalate or the like having a magnetic coating on at least one side to thus define a magnetic recording surface. Such disks 1' are adapted for protective containment and operation within an envelope or jacket 3' as indicated by prior art jacket 3' in FIG. 2 within which such a floppy disk may be stored, as well as rotated for magnetic data-transcription when inserted into appropriate apparatus.

Thus, disk 1' has a central aperture 1'-h for engaging a conventional rotary-drive spindle (while contained within jacket 3'), there being a prescribed recording track zone 1'-T defined between respective inner and outer track margins 1'-IT, 1'-OT; also, an "index hole" 1'-Ih is disposed (within 1'-IT) along a prescribed "reference radius" AS and adapted to establish a "Start Radius" for the circumferential data tracks as known in the art. Within inner non-recording margin 1'-IT is an inner "contact annulus" defining the locus of engagement with spindle-contact means as known in the art.

Locator-hole Array

According to a first feature of novelty, a file of novel flexible disks D-1, D-2, D-3, etc., generally like disk 1, are manufactured as a group and adapted to include a prescribed array of separating apertures, or locator holes, L-H, as schematically indicated, for example, by locator holes L-1, L-2, L-3, etc., in FIGS. 3 and 4. This aperture array will be seen as establishing a certain mode whereby the stacked disks may be partitioned according to a unique, simple control involving merely rotating the stack to different (rotational) angular positions, each position corresponding to exposure of a respective one of the disks. Each disk in a file, or stack, S will be understood as having a unique identifiable number of such locator holes L-H so that when the disks are superposed with their index holes 1-Ih and their circumferential edges in registry, they will be seen to represent a hole-encoded array. That is, when viewed from one side, the stack will present an array of locator holes L-H in registry at different circumferential angular locations about the disk periphery that terminate at successive disks. Thus, each locator hole corresponds to a prescribed select-plunger site adapted to facilitate the splitting, (i.e., partial-partitioning), of the stack to expose the recording surface of a corresponding selected disk.

Accordingly, locator holes L-1 pass through all disks and correspond to the "selection" (exposure of upper surface) of the top disk D-1, holes L-2 correspond to exposure of D-2, terminating at disk D-1 so that insertion of a plunger therethrough splits pack S to expose the upper recording surface of disk D-2—or the lower surface of D-1; while holes L-3 expose D-3; holes L-11 expose disk D-11, and so on. This hole pattern is unique for each disk, the holes adding cumulatively in one direction along the pack axis.

Preferably, locator holes L-H are arranged along a circumferential track or locator locus L-T and spaced a prescribed constant radial distance from the disk center and separated by a prescribed constant circumferential distance, or angular separation (that is, angular displacement $\phi_{1-2}$ is the same as $\phi_{2-3}$, etc., in FIG. 3). These encoded locator holes are thus each centered on a prescribed associated radial axis, e.g., axis $A_{X}$-1 for hole L-1, $A_{X}$-2 for hole L-2, etc., the holes being of prescribed identical size and configuration—one configuration being elliptical holes (or notches, as discussed below). Thus, as better illustrated in associated FIG. 4, for instance, when eleven (11) such flexible disks 1 are superposed in registry, a stack S results, including disks D-1, D-2 through D-11 disposed for co-rotation by a common spindle (not shown here, but well known, and schematically indicated in FIG. 6 and described below). The pattern of locator holes will be such as to provide the mentioned hole-encoding and enable a prescribed mode of partition.

Thus, for instance, the topmost disk D-1 in the stack is arranged to have a single hole L-1, while the second disk D-2 is arranged to have one additional locator hole L-2 (besides L-1) disposed along an initial axis $A_{X}$-2; the third disk D-3 in the stack in turn arranged to have identical locator holes L-1, L-2 (as disk D-2) together with one added locator hole L-3 (distinguishing it from D-2, D-1 and all other disks in stack S) aligned along axis $A_{X}$-3 and along circumferential axis L-T, $A_{X}$-3 being angularly displaced from $A_{X}$-2 by a prescribed constant angle. The fourth disk D-4 (not shown) is accordingly likewise cumulatively encoded with locator holes L-1, L-2 and L-3 in registry with these holes on D-3, together with an added hole L-4 along axis $A_{X}$-4 uniquely identifying this disk and spaced along track L-T and angularly displaced from axis $A_{X}$-3 by the same prescribed amount $\phi_{1-2} = \phi_{2-3}$ (for example 18°). Eleventh disk D-11 is similarly encoded according to the same pattern, its locator holes L-1 through L-10 being a duplicate of these of adjacent disk D-10 with hole L-11 being added as indicated; (and likewise for other disks in the pack). Such a select hole-encoding will generate a coordinated stack of flexible disks which is arranged so that insertion of a separating plunger at a prescribed angular orientation (e.g., along track L-T, at a selected angular increment from the "Start Radius" AS) can deflect an appropriate sub-group of disks aside to create the desired stack partition for transducer access and engagement with the selected, corresponding disk surface, as illustrated in FIGS. 5 and 6.

This operation will be better understood by consideration of FIGS. 5 and 6 where stack S is shown engaged upon a turntable TT with the disk hubs suitably engaged (e.g., pressed thereon by spindle clamp SC) against rotatable spindle hub S-H as known in the art. A plunger, or disk-select means P will be disposed nearby, being located generally along the "cylindrical locus" including locator track L-T such as to be selectively insertable up through track L-T a prescribed excursion—and thereby split pack S for "transducer access" by transducer assembly 117 (FIG. 6). Assembly 117 comprises a carriage including arm 11 carrying transducer head 15 and threadedly engaged at barrel 118, for lateral translation (into pack S as is well known—see arrow) by rotation of lead screw 112. Motor 111 is coupled to rotate screw 112 and controlled in a known manner to effect this pack-insertion at prescribed times. Thus, transducer 15 is generally thrust toward, or away, from pack S as indicated and known in the art so that any given (upper) disk surface may be accessed and operated upon.

Thus, in the illustrated arrangement of FIGS. 5 and 6, the upper surface of disk D-3 will be understood as "selected" for access by transducer 15 with overlying disks D-1 and D-2 being thrust upwards and away by plunger P as shown. Accordingly, (and understanding the hole-encoding to be as indicated in FIGS. 3 and 4 above) for selection of D-3, pack S will be angularly rotated with respect to the "thrust-path" $T_p$ of plunger P to bring P into registry with selected locator hole L-3. Now, when plunger P is actuated to be thrust upward, it will pass through holes L-3 which are provided in all disks D in the stack S except for disks D-2 and D-1 (which have no L-3 holes)—and this will thrust D-2 and D-1 upwards (as indicated in FIGS. 5 and 6) to a prescribed partially-partitioned condition. This will allow entry of access arm 11, and particularly of shroud 13 on the distal end thereof. As further discussed below, plunger P is later retracted with shroud 13 then providing supporting engagement with (the lower surface of) disk D-2 during stack rotation. In this way, disks D-1, D-2 may be held deflected-away while pack S is rotated and head 15 is engaged on D-3 for a transducing operation.

According to a further feature, shroud 13 is arranged to smoothly engage such as deflected disk—bending all deflected disks over head 15 as the pack is rotated (within its jacket); also allowing the assembly 117 to be thrust a greater or lesser extent into the stack for translating transducer 15 between various recording tracks on a selected disk.

Similarly, if disk D-2 is next "selected" for transducer operations, transducer mount 117 will be withdrawn, and the rotation of stack S interrupted, with the stack being oriented (as discussed below) to align locator hole L-2 (associated with selection of D-2) above plunger P so that upward thrust of the plunger the same prescribed distance as before will pass it through the registering locator holes L-2 in all disks except uppermost disk D-1—which has no L-2 hole and accordingly will be thrust into the approximate location of disk D-2 in FIG. 6. This will then allow the reintroduction of the access arm 11, i.e., of shroud 13 which will then be engaged with the underside of D-1, so that, with the subsequent retraction of plunger P, stack S may again be rotated to initiate transducer operations upon this selected recording surface (upper face of disk D-2). FIG. 5 indicates, in schematic perspective view, the same upward thrusting of disks D-1 and D-2 and splitting of stack S as indicated in the side sectional view of FIG. 6, with the disks flexing and bending along a prescribed portion thereof (FL) under the upward thrust of the plunger.

Partition Method

It will be evident that such a partitioning mode involves the simple rotation of the pack relative to the plunger, i.e., to an angular orientation which registers a corresponding pack-select-site therewith. Workers will perceive various ways of effecting this. Preferably in this embodiment, for each partition cycle (i.e., associated with exposure of each disk), the pack is brought to the reference orientation [i.e., rotating to align "Start Radius" with the plunger path] and then advanced by the number of successive select-sites required to register the proper site (i.e., corresponding to the particular disk "selected") with the plunger path—preferably doing so digitally. The cited applications summarize preferred exemplary dimensions and characteristics of this floppy disk embodiment and associated disk pack mentioned and their recording characteristics.

Various alternate configurations and materials will occur to those skilled in the art, such as the use of chromium oxide or like magnetic coating or the use of acetate or like flexible substrate material, or the arrangement of locator holes in different patterns and/or shapes as discussed below.

Alternate Locator-aperture Configurations

Figure 3A:
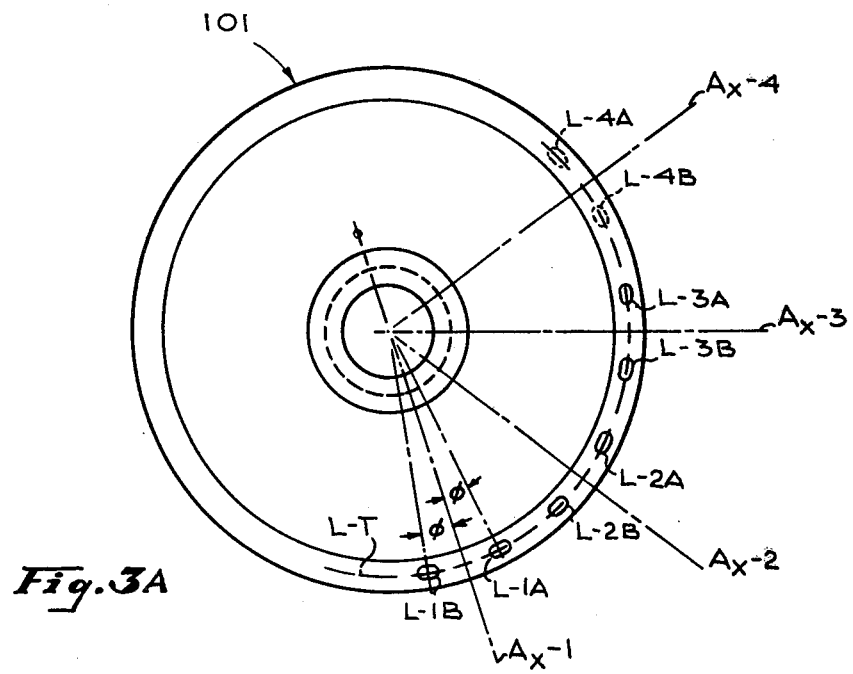
FIGS. 3A, 3B, 3C and 3D are like views of alternate arrays of holes (apertures)
Figure 3B:
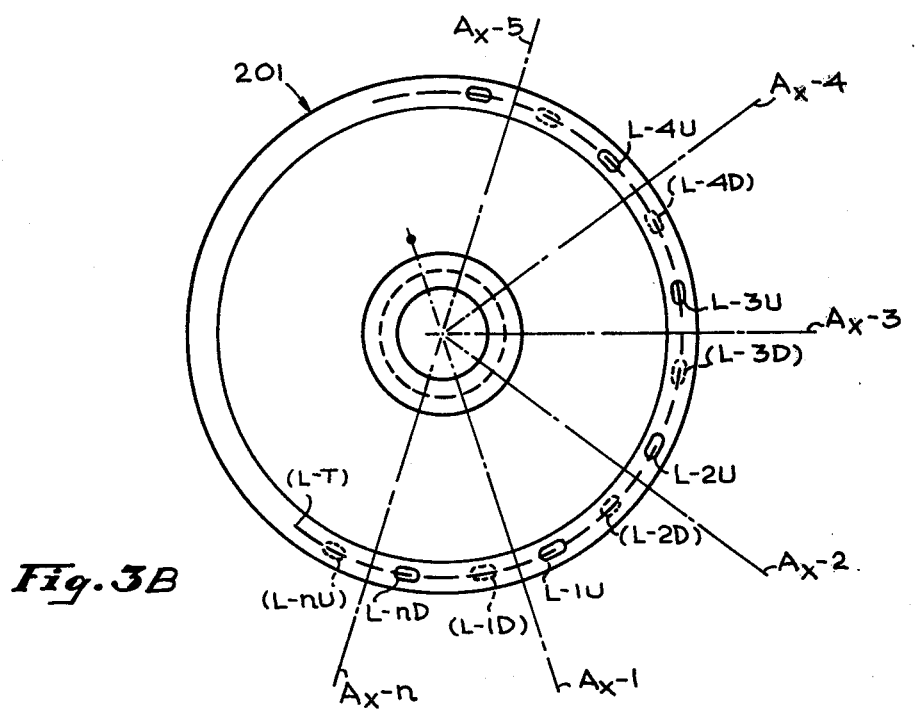
Figure 3C:
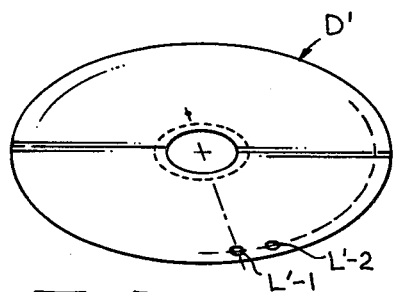

The locator holes L–H need not be elliptical but may instead be circular as indicated in FIG. 3C, (rather than being elongated along the locator axis L-T sufficient to accommodate contemplated variations in locator-rod positioning relative to the disk stack, as is indicated in FIG. 3). Disk D' in FIG. 3C is generally the same as the disk 1 in FIG. 3, except that the locator holes L-1, L-2, etc., in FIG. 3 are extended in their elongate direction along axis L-T to be roughly twice as long, with rounded edges, (preferred: about 0.16 × 0.3 inches where they are circular in FIG. 3C).

Figure 3D:
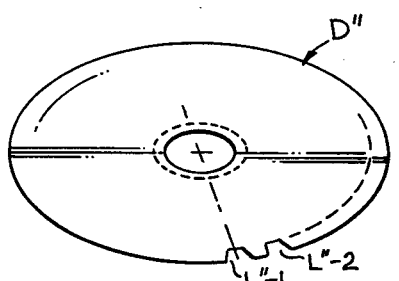

As a further alternative, the locator apertures may comprise "notches" rather than "holes" as indicated in FIG. 3D for alternate disk embodiment D''. Disk D'' is generally the same as disk 1 in FIG. 3 except that the locator holes here comprise a pair of rather semi-elliptical edge notches L''-1 and L''-2. Workers in the art will conceive other like modifications, for instance, where the entire periphery of the disk is "cut-out" between all locator holes—such as by cutting out the "lands" between L''-1 and L''-2 in FIG. 3D. Alternatively, the disk periphery may be cut-back within the hole peripheries except for "sector-lands" extending radially from the disk, forming extended circumferential "tabs" adapted to engage select-rods—being disposed entirely about the disk except where the locator holes would have existed (and between such locator sites as well). Of course, the size and configuration of a locator aperture will generally correspond to that required to accommodate a given partitioning-plunger (shape, diameter) configuration and consistent with the positioning accuracy of the associated "select-partitioning" system. Such a "tab-select" arrangement will be better adapted for relatively rigid disks.

Multiple "Partition-plungers"; "Paired" Locator Holes

Further, according to one feature of invention, indicated functionally in FIG. 3A, a plurality of such "partition-plunger means" (rather than a single plunger) may be used, together with associated plural sets of accommodating locator-holes. Thus, a modified embodiment 101 (identical to disk 1 in FIG. 3 except as otherwise described) will be seen as including "locator-sectors" characterized by a pair of locator holes A and B symmetrically flanking each "locator axis" and equidistant therefrom. With such a modified "double-hole" locator pattern, disk 101 will thus be understood as intended for use with a pair of partitioning plunger rods, each similar to that described in connection with FIGS. 5, 6 and 11, except that two rods (rather than one) are used to deflect the pack (—such a pair being more fully described below in connection with FIG. 12).

Thus, for instance, rather than a single select hole (e.g., L-1, FIG. 3) being centered in a "first locator sector" along the "first selector radius", $A_X$-1, the so-modified flexible disk embodiment 101 (FIG. 3A) substitutes a pair of such holes (L-1A, L-1B), each displaced from this axis $A_X$-1, on opposite sides along locator track L-T, by the same angle $\phi$ (i.e., symmetrically flanking their associated selector radius). Similarly, the second locator sector and its radius $A_X$-2 serve to reference two "select apertures" (rather than one), namely L-2A, L-2B; likewise for the "third" select radius $A_X$-3 about which a pair of associated select apertures L-3A, L-3B are symmetrically flanked.

Thus, for example, (and as more fully described below) when the flexible disk (D-4) next to disk 101 (assumed to be D-3), in an associated stack is to be "selected" for Read/Write operations, the stack will be partitioned by the pair of locator rods—the rods being moved into registry with associated locator holes L-4A, L-4B (shown in phantom here) flanking the "fourth" select radius $A_X$-4. Then, when one is thrust upward in the "standard" manner, disk 101 (i.e., D-3) along with the first and second in the stack (i.e., D-1, D-2) will be lifted upwardly to expose the upper recording surface of D-4.

Up/down Selection Mode, with Opposed Plunger Pairs and "Stripping" of Selected Disk FIG. 3B and FIG. 16 indicate how one or two pair of associated select plunger means are adapted to be "opposingly partitioned", i.e., be driven in opposite directions, so that, to the upward partitioning-thrust there is added a second contemporaneous downward, partitioning-thrust in each partition operation. As workers can see, this added down-thrust can "strip" the "selected" disk from the upwardly-thrust stack portion—more positively and more quickly—and prevent it from being accidently carried-up with it (e.g., adhering via suction or static electricity, etc.). Further, such a "paired-sites-/alternate hole" array of locator holes is provided to accommodate this "opposed partitioning" mode. Modified disk embodiment 201 in FIG. 3B illustrates this schematically (being identical to embodiment 101 in FIG. 3A, except that only one "companion hole" in each pair is cut through—to thereby accommodate opposing (up-down) plunger action on a sector during "selection". Thus, there are still a pair of select-hole "sites" in each sector). The site pairs flank their associated select-radius $A_X$ in equidistant symmetry; however, with only one hole in each such pair actually cut through at any sector—i.e., with "up-holes" cut where sector-selection involves selection of the given disk or a superposed one, and with "down-holes" through all other sectors. This hole-pattern will be seen as accommodating the "opposed-partitioning" mode described.

Thus, for instance, disk 201 may be viewed as constituting the fourth disk (from the top) in a stack (much in the manner of embodiment 101 in FIG. 3A), with each of its select radii $A_X$ flanked symmetrically by a pair of such (up/down) "select sites", (e.g., an upward-select site at L-1U, with a hole cut there; and a downward-select "site" L-1D, with no "hole" cut there—both these hole-sites being found in the "first sector", symmetrically flanking the "first" select axis $A_X$-1).

This "paired site/single hole" pattern of locator-holes will be understood as functioning to provide each disk in a given stack with one, and only one, select hole cut in each and every one of its "select sectors". Thus, for any given disk in a given stack, there will be one such locator hole (but only one) cut in each sector—with "up" holes cut in the disks own "select sector" (e.g., sector "four" at $A_X$-4 for disk D-4) implying up-deflection of superposed disks; and in all the "lower-order" sectors (corresponding to the number of disks "below" the given disk, e.g., D-5 through D-20 "below" selected disk D-4); whereas, conversely, "down" holes are cut in all other disks ("higher order") at this sector. For example, for disk 201, or D-4, in a 20-disk pack, "up-holes" L-1U, L-2U, L-3U and L-4U are cut only for the first four sectors, with "down" holes cut for all other, "higher-order", sectors (i.e., L5D, L-6D through L-20D). Similarly, the "topmost" disk (D-1) has an "up-hole" cut only at its first sector (adjacent axis $A_X$-1) with all other holes being "down-holes".

Hence, in the selection of the "first" (i.e., top) disk D-1 in a stack, associated with disk 201, the upward thrusting select-plunger will be understood to pass through all disks (through "up-holes" L-1U in the first sector of all disks including D-1), while the downward-thrusting plunger will pass through "no disks", but merely thrust D-1 downwardly to "pin" it. Or, for the selection of the next (i.e., second) disk, D-2, in this stack, the "up plunger" will be registered at L-20 and will pass through all disks except D-1 (through all "up" holes in the second sector of D-2 to D-n), and so deflect D-1 to expose D-2, while the "down plunger" will register at site L-2D and will pass only through disk D-1 to "strip-away" D-2, pushing it downward. Or, in the selection of the third disk, D-3 the "up" plunger will pass through disks D-3 to D-20 (L-3U holes therein), while the "down" plunger will pass through disks D-1 and D-2 only (L-3D holes therein)—so on and so forth.

Now, a "paired" array of locator holes as above described (such as in FIG. 3A) need not, in all cases, imply the symmetry of hole location described and illustrated (i.e., symmetrical flanking of given select axis). But such symmetry is preferred. For instance, it affords an extraordinary, unexpected advantage in event of "double side" recording whereby the disk stack may be "flipped" (turned upside-down) and still be partitioned with a plunger pair, without any change in the relative positioning or the operating mode of the plunger arrangement. Workers in the art will perceive this to be a very significant advantage and convenience.

A modified form of the mentioned "opposed" array of partition plungers is depicted in FIG. 16 where pack P will be understood as adapted for up/down partitioning by opposed plungers P-V (deflecting part of pack P upward, away from a "selected" disk D-S) and P-L, (deflecting the rest of pack P downward). Unusually, however, such an arrangement is intended to leave the selected disk D-S exposed top and bottom for transducer access (e.g., by a double-sided transducer array as described below). Accordingly a second set of opposed "centering plungers", P-V$_2$, P-L$_2$, are also provided, preferably, to hold selected disk D-S in position for transducer access. The structural and operational details of such elements will become clearer upon consideration of embodiments below.

Workers will perceive various other advantages accruing from the foregoing novel hole-encoded flexible disk design and associated partitioning according to the invention. One such advantage is that it is compatible with the bulk of present day recording disk media, as well as with known equipment for handling such disks—thus being adapted for use, interchangeably, with conventional floppy disks where desired. For instance, the existence and pattern of the peripheral locator hole pattern need not interfere with, or change in any way, the operation or construction of a conventional (single-disk) drive and Read/Write assembly. Also, as indicated, the disk is adapted for mounting on standard (single) flexible disk turntables for transducing rotation and for relatively conventional transducer access and engagement the units being modified to accommodate pack dimensions. Further, such an improved flexible disk pack may be combined with conventional (single-disk) protective jackets, as indicated below and in FIG. 2. Moreover, workers will recognize that a "hole-encoding" scheme such as employed herein for flexible disks may, in certain instances, be adapted for rigid, or semi-rigid disks as well.

The cited applications detail how improved flexible disks like those described above may be fabricated, and rendered apt for collation and stacking together in combination and properly registered in a novel "flexible disk pack".

Figure 2:
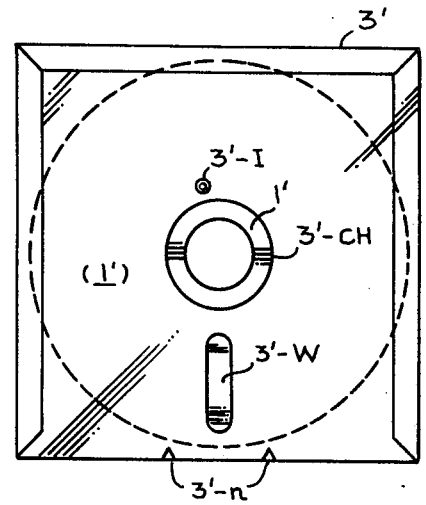

By way of illustration, it has been found that a pack of 20 flexible disks according to the invention (e.g., as in FIG. 3 and Table I), each with a nominal 3 mil thickness, can be used in a "floppy disk pack" presenting a composite thickness of little more than 60 mils and, rather surprisingly, may be readily packaged and operated in a protective jacket similar to the prior art jacket indicated in FIG. 2. Further, such a pack may be manipulated and operated inside this jacket with disk drive equipment that requires relatively little modification over the conventional single-disk drives known in the art.

Figure 5A:
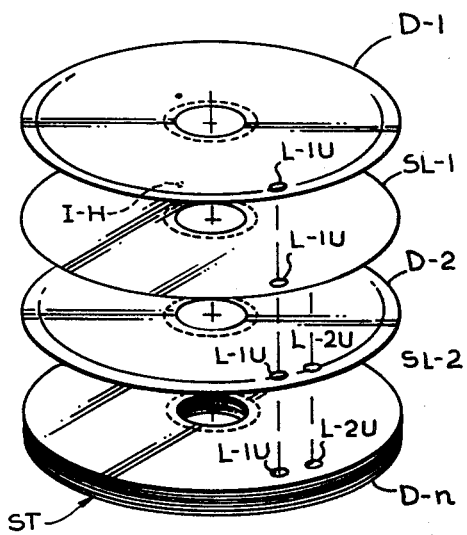
FIG. 5A shows a similar, schematic, view of a like disk pack embodiment, including separator disks as well, with several elements exploded-away for illustration purposes.

Also, in certain instances, as indicated in FIG. 5A the pack may include protective flexible spacers, or "liners" (SL) interleaved between adjacent disks in the pack. More particularly, FIG. 5A shows the upper two flexible disks, D-1 and D-2, exploded-away from stack ST for illustrative purposes, and indicates the protective liner means in the form of flexible plastic disks, SL-1 and SL-2, interposed between D-1/D-2 and between D-2/D-3, respectively.

Workers in this art will visualize various practical ways in which hole-encoded flexible disk records of the type described may be manufactured. One such method is schematically indicated in FIGS. 13 and 14 and described in the cited applications. It involves a die press, or punch, arrangement particularly apt for punching-out all the several apertures of disk embodiments like those described in FIG. 4, etc. Alternatively, a single aperture pattern may be used, but the disks stacked (rotated) so as to render the desired array of partition bores.

Figure 7:
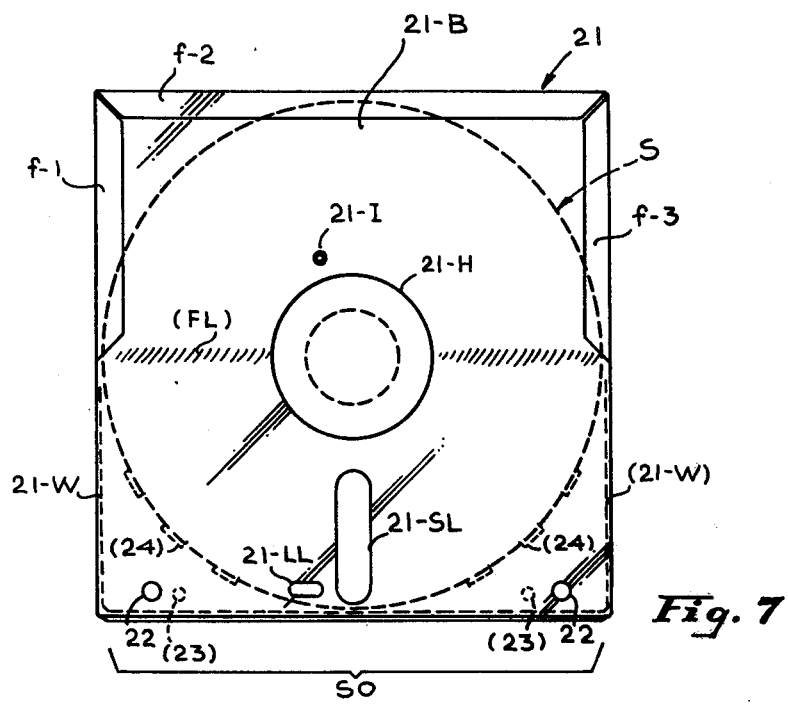
Figure 8:
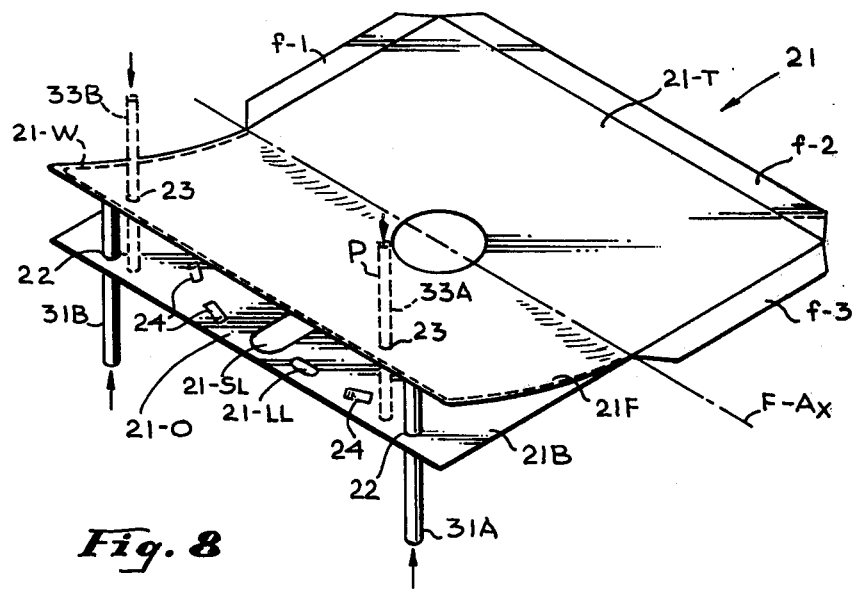
Figure 9:
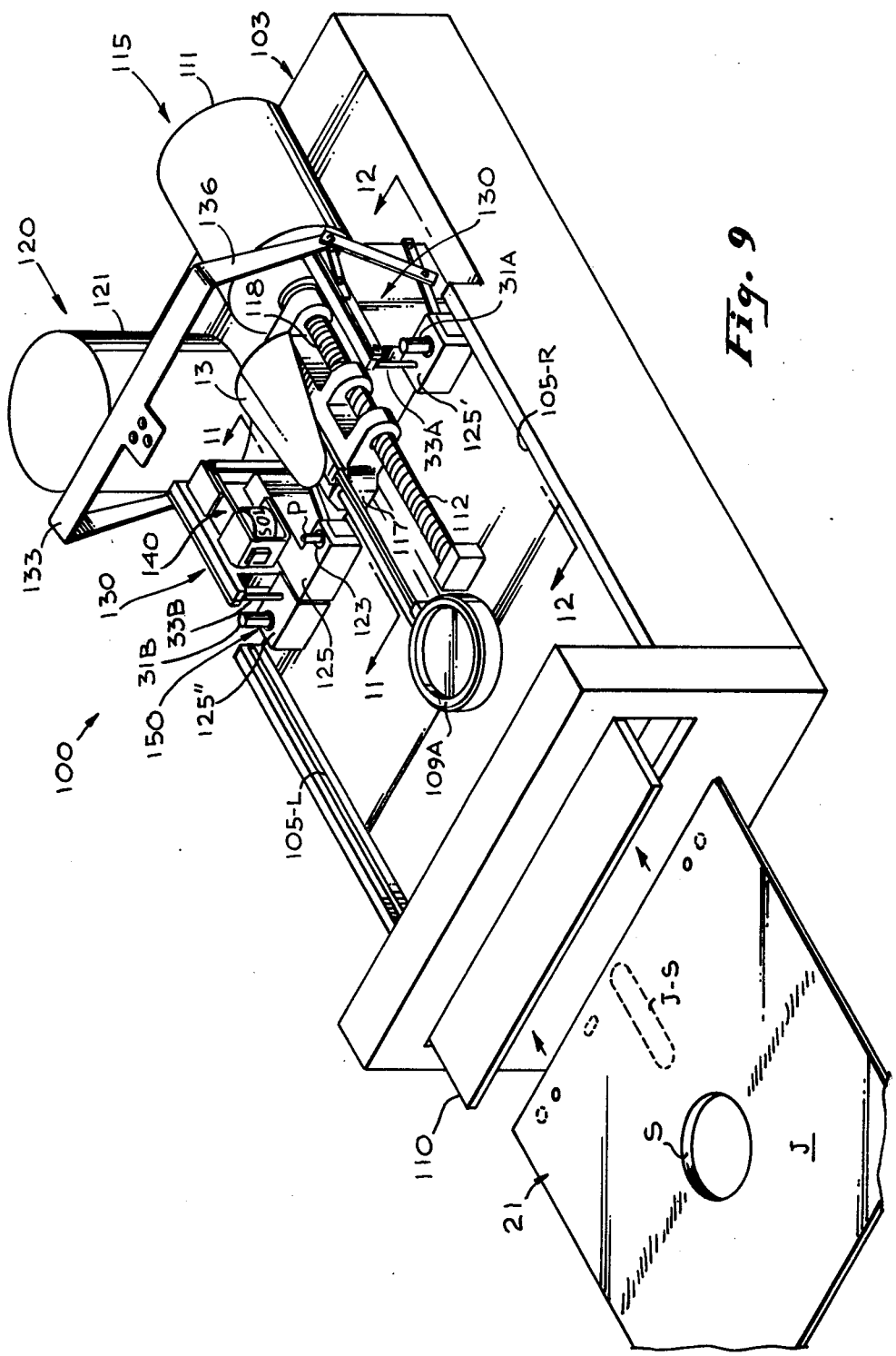

Novel disk pack embodiments like those above described will be understood by workers to be particularly apt for advantageous use in the form of a cartridge, i.e., the resulting structure obtained when the disk pack is employed in conjunction with a protective jacket structure in which the disk pack remains during partitioning and transducing operations. Such a jacket 21 is indicated, for instance, in FIGS. 7 and 8, being designed somewhat along the lines of a prior art, single-disk jacket 3' (FIG. 2), but modified for the purposes of the present invention as detailed in the cited applications. Jacket 21 is shown in plan "bottom" view in FIG. 7; and is shown, in "top" perspective view, in FIG. 8 as cooperated with jacket-opening means, schematically shown in conjunction therewith and functioning as described below. Such a modified jacket will be perceived as especially suited for housing a rotatable pack of flexible disks, like pack S in FIG. 5, being apt for accommodating the rotation thereof, in situ, as well as for the locator hole partitioning mode and associated transducer access described above. Illustrative pack S is shown outlined in phantom in FIG. 7, Spreading is preferably done automatically when the so-formed cartridge (jacket 21 containing disk pack S) is inserted into a disk drive, (FIGS. 9 and 10) this being indicated schematically by the up-thrusting plungers 31 and the down-thrusting plungers 33 in FIG. 8, according to another feature. Downplungers 33 are preferably also arranged to pin the jacket to a fixed portion of the chassis to hold it fixed with respect thereto when the pack is rotated therein. Preferably the "spreading action" of these plungers is automatically invoked by closing of the entry door of the drive apparatus after admission of the pack-containing jacket (FIG. 9). It will thus be apparent that the two opposed (upper and lower) "spreader means" 31 and 33 act in concert to separate the outer edges of the "entry slot" 21-0 when the disk pack is to be "accessed" by a transducer assembly (FIG. 6).

Jacket 21 and the flexible disk pack contained therein thus comprise a novel flexible disk cartridge, with the pack so positioned and held therewithin as to be free to rotate, as well as to be selectively partitioned and accessed therein as previously described. Jacket 21 is preferably lined with a non-shedding, non-abrasive cleansing tissue on its inner faces as known in the art, to wipe clean and protect the outer surfaces of the disk pack contacted thereby.

Modified Drive for Flexible Disk Pack

Figure 10:
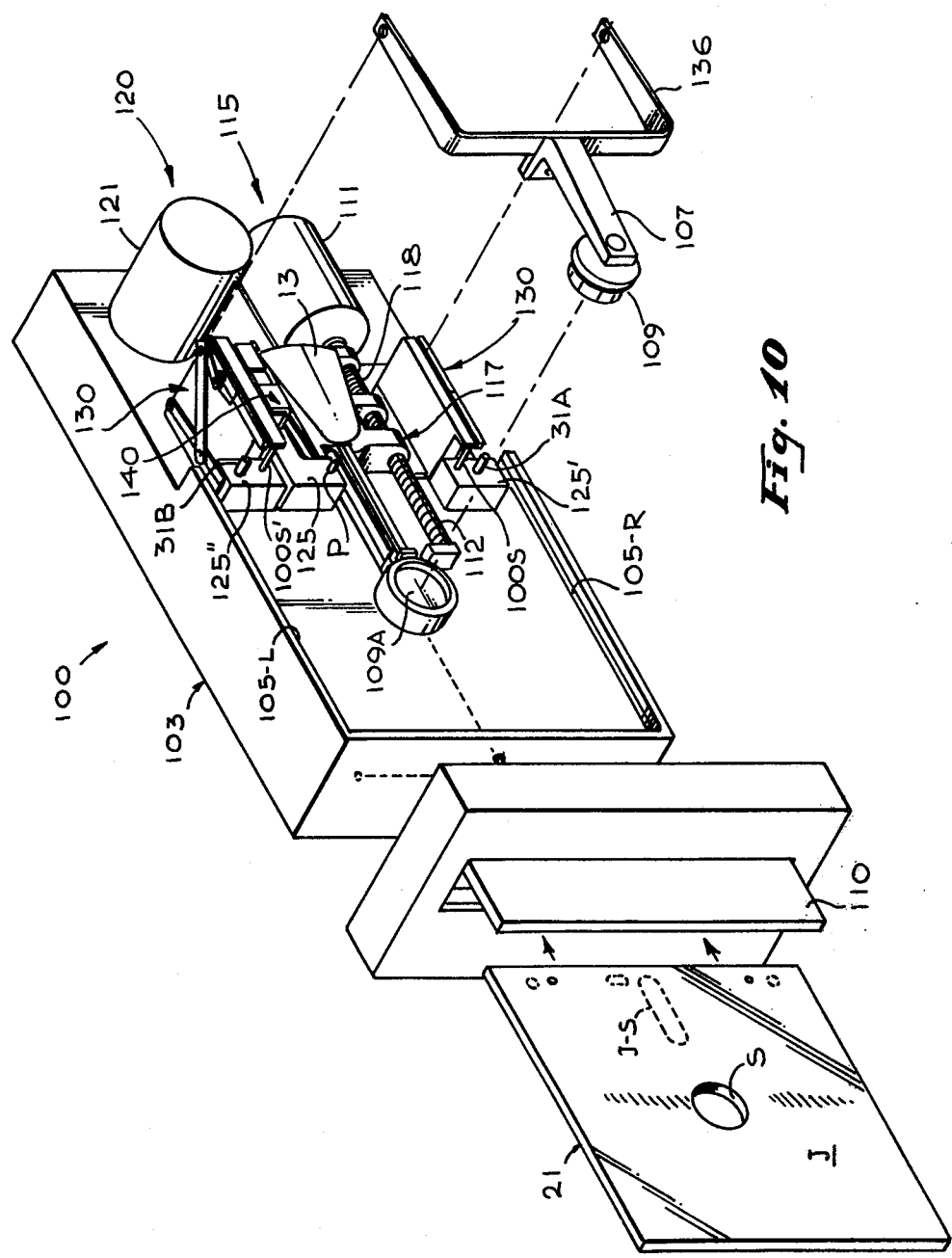

FIGS. 9 and 10 show a relatively conventional type of flexible disk drive 100 which has been modified to accommodate operation with novel cartridges (jacketed flexible disk packs) according to the invention. That is, drive unit 100 will be understood by workers in the art to comprise a compact, portable, disk drive device that interfaces with a central processor portion of a data processing system by way of a suitable control unit (not shown), as known in the art.

Figure 11:
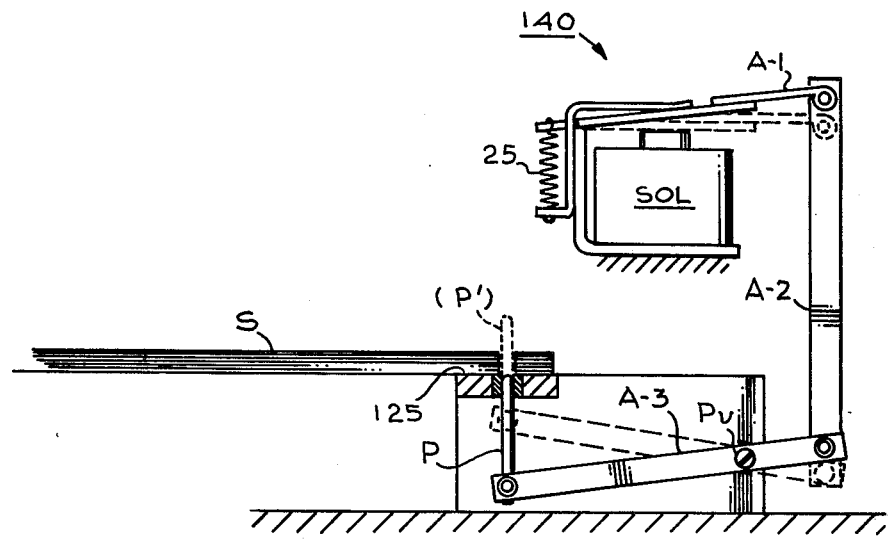
Figure 12:
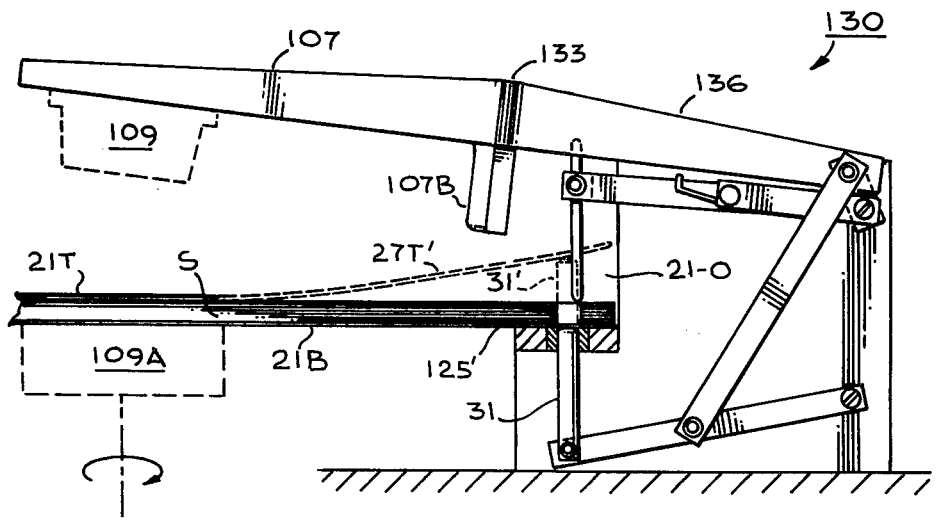

Thus, such a modified disk drive as shown in FIGS. 9 and 11, while otherwise constructed and operating as known in the art, will be understood to include modifications required in order to make advantageous use of the novel disk pack and jacket of the present invention, such as, for example: jacket-opening spreading means (FIGS. 7, 8 and 12); pack rotation (vs. disk rotation) means (FIG. 6); pack partitioning means (FIGS. 3, 6 and 11) and an associated transducer assembly (FIG. 6). Details are described in the cited applications. The pack rotating spindle will be understood as being controlled to rotate the pack to any one of several angular orientations (one associated with the accessing of each disk in the pack) for partitioning, and is preferably operated with a motor adapted to be stepped by prescribed precise constant increments, representing digital control signals. This facilitates precise digital control to step the pack by precise angular increments to any selected partition orientation.

The major components of drive unit 100 thus comprise a transducer accessing arrangement 115, (e.g., including transducer carriage 117 and translation motor 111 of FIG. 6), a pack-partitioning subassembly 140 including plunger P projectable through a bore in surface 125 (see FIG. 11), a jacket-spreading subassembly 150 including two pairs of upplungers 31-A/31-B and 33-A/33-B (FIGS. 9 and 10) projectable through bores in surfaces 125', 125" (see also FIG. 12), and the mentioned rotary drive subassembly 120 (comprising spindle motor 121, spindle 109-A and hub 109 mounted on pivot-arm 107), the entire assemblage being mounted upon a chassis 103. These mechanisms will be understood as constructed and operated in a known fashion except as otherwise described.

Thus, transducer subassembly 115 comprises a Read/Write head unit, or mount 117, normally disposed just beyond the pack and adapted to be projected inward as discussed re FIG. 6, atop a hollow threaded tube 118 threadingly engaged on a lead screw 112 adapted to be rotated endlessly in precise incremental fashion by an associated stepping motor 111. Once a pack is partitioned this subassembly will be understood as operative to translate R/W transducer 15 onto the selected disk surface and track with shroud 13 serving to support the upper pack, guiding it over head 15 while the pack is rotated. As workers in the art well realize positioning of the Read/Write head 15 (FIG. 6) is accomplished conventionally with the lead screw drive from linear stepping motor 111, with head 15 (mounted on the carriage coupled to be translated by this lead screw) stepped-in or -out, upon command, in incremental fashion by actuation of the stepper motor, rotating the lead screw a corresponding amount.

Plunger Actuation FIGS. 6, 11

Partitioning is effected, preferably, by a prescribed partition subassembly 140 including a select plunger (see plunger P in FIGS. 6 and 11) disposed to be thrust upward through an accommodating aperture 123 in working surface 125, upon actuation by an associated solenoid SOL. That is, as will be understood from FIG. 11, a "partition-signal" applied to energize the solenoid coil will act to pull a "clapper arm" A-1 down (against return spring 25) and throw an associated plunger-linkage (arms A-2, A-3 pivotably mounted at pivot pv on the chassis downward and thereby thrust) plunger P upward as indicated in phantom in FIG. 11. This partition assembly will be recognized as particularly compatible with the subject "floppy pack" and with unit 100 to perform the select partitioning function of the jacket-encapsulated pack in the above indicated manner.

According to a related feature, spindle drive motor 121 is adapted to rotate the pack, disposed within the jacket J and engaged between hub 109 and drive spindle 109-A, for transducing, as known in the art, as well as to shift according to a related improvement feature, into a second rotary-step mode for partitioning-positioning. That is, responsive to a prescribed indexing (digital) control signal, motor 121 will digitally step the spindle and pack rotationally by a prescribed precise number of integral angular increments until the selected "partition orientation" (i.e., rotation) is achieved. Thus, in effect, the pack is made to step from "zero" (or "Start Radius" see index hole 1-Ih and axis $A_x$-1, FIG. 3) a prescribed number of "angular steps" to thereby "count" its way, digitally, to a prescribed locator hole position. Here, a plunger P may thrust the pack to partition it and expose the corresponding selected disk recording surface, as described above. For instance, in this embodiment it is convenient to step-rotate the pack 1.8° per digital "stepping pulse" using a dual mode motor, so that, with the locator holes (embodiment of FIG. 3) separated at 18° intervals, each rotary increment of 10 steps will carry the pack 18°, i.e., from one locator hole to the next.

Thereupon the transducer carriage means (see step translation motor 111) may be activated to initiate head entry into the so-partitioned pack (from an outer reference position) while the partitioning plunger P is conjunctively withdrawn. Carriage-entry will thrust the transducer down upon the selected disk surface and will allow the distal end of the transducer mount, and particularly shroud 13 mounted thereon, to contact and assume support of the upwardly-thrust portion of the pack. Shroud 13 will maintain this contact, guidingly, while the pack is rotated and the Read/Write operations are performed.

That is, stepping motor 111 will translate the transducer head into the split pack and place it in compliant "gliding" contact with the selected recording surface of the disk for transducer operation (e.g., see U.S. Pat. No. 3,810,243 for typical operations). Upon completion of the transducing operations, at one or several tracks, the head may be withdrawn and a different recording surface (disk) accessed in another partitioning cycle. The indicated novel partitioning and head mount arrangements will be seen as establishing stable, protected transducer positioning at any selected disk surface of such a flexible pack.

According to this feature, the transducer is kept disk-engaged while moving from track to track on the selected recording surface, until it is entirely disengaged and withdrawn to the outer "rest position" (FIG. 6). During partitioning and transducer entry, the rotary drive will, of course, hold the pack in fixed position, being thereafter rotated (at 360 rpm) for transducer operation with the "upper" deflected disks (above the selected one) being bent smoothly up over the mentioned shroud 13, as they pass over the transducer carriage 117.

Shroud 13 is configured, positioned and adapted, according to a related feature, to smoothly, frictionlessly guide and urge these "upper disks" (above the split) thus upward, while they are so rotated to permit the unimpeded, non-damaging entry and withdrawal of the transducer mount into, and out of, the split-pack (e.g., for Read/Write operations at different disk tracks).

Workers in the art will appreciate that with such a select/partitioning means, operable in conjunction with such a hole-encoded flexible disk pack, the pack may be split to expose any selected disk, conveniently, yet precisely—e.g., simply rotating the pack to a prescribed angular position corresponding with registry of the plunger with the associated partitioning pattern of locator-holes, then thrusting the plunger up these locator-holes sufficient to admit entry of the transducer-shroud. Thereupon the plungers are retracted and rotation of the pack may be resumed.

Thus, for instance, when the "nth" disk in a pack is selected, the pack will be rotated to "START" position (index hole reference), then stepped by (n × 18°) the angular increments corresponding with a rotation of the pack so that the associated locator-sites register with the plunger-locus. Up-thrust of the plunger will then lift all disks "above n" away from the upper surface of "n" disk, exposing the latter for transducer entry as described. For instance, as workers known, such a stepping motor/lead screw arrangement can position the transducer head on any one of about 77 discrete track positions of a disk surface. Unexpectedly the "paper thin" disks can interfit slidingly while rotating, yet appear to experience minimal frictional wear and damage at the contacting surfaces, especially when protected by the mentioned flexible inter-liner means.

Plunger Drive (FIGS. 15)

FIGS. 15A, 15B and 15C show, rather schematically, according to a novel feature hereof, a preferred arrangement for driving an opposed plunger array to effect a "double partition" of the pack (e.g., as schematically shown in FIG. 18); i.e., such partitioning being effected on both sides of selected disk D-S. Disk D-S will be understood as adapted to be operated upon by a double-sided transducer array TR, as further explained below (TR shown very schematically in FIG. 16 also). That is, although, the upper and lower plungers may be separately, and somewhat independently, driven, it will be recognized as convenient and usually preferable to drive them from a common source, and somewhat synchronously.

Such a "double-partition" is very schematically depicted in FIG. 16 wherein, for an illustrative floppy disk pack PK, an upper portion of the pack, PK-U, is thrust away from an intermediate selected disk D-S by a pair of upwardly-thrusting "lower plungers" (shown actuated by associated arms AL-1, AL-2); while, conversely a lower pack portion PK-L is similarly-thrust away from disk D-S by a pair of "upper plungers" (actuated by AU-1, AU-2)—this being sufficient to open a cavity on both sides of D-S, sufficient for access by a "double-sided" transducer array (see TR in FIG. 18) as known in the art.

Accordingly, the "opposed plunger" drive arrangement depicted in FIG. 15A will be recognized as comprising a rotary-driven affair with linkage arms connecting each plunger to be thrust opposingly and synchronously by a rotationally-actuated hub H at a prescribed time. Hub H will conjunctively reciprocate the upper and lower plungers, (P-U, P-L, respectively) relatively toward—and away from—one another to effect the "double-partitioning" of the pack, away from the intermediate selected disk (as mentioned above with the associated advantages of "stripping" etc.). More particularly, hub H is mounted from the machine base to be controllably rotated (about axle pv by conventional means, not described, but well known, such as a known unidirectional solenoid drive with spring-return).

Upper plunger P-U is coupled to hub H for reciprocation thereby via a driver arm A-U connected to the plunger rotatably through a known "oversized-slot" linkage OSL, or the like, and is mounted to be pivoted from axle pv, adjacent to hub H, being coupled to H through an extensible coil spring SP, or the like. Spring SP will cause arm A-U and plunger P-U to "follow" the driving rotation (direction of the arrow) of hub H so that plunger P-U will be thrust down, when hub H is rotated "forward" from a "rest" condition (FIG. 15A) to an "actuated" condition (as indicated in FIGS. 15B and 15C). This causes P-U to fully deflect the associated (lower) portion of the pack downwardly. Plunger P-U is returned when hub H is reverse-rotated, arm A-U being contacted by a cam wedge CR, carrying it back from the "actuated condition" (FIG. 15B) to the "rest condition" (FIG. 15A) as understood in the art.

Similarly, the lower plunger P-L is connected to hub H via a pair of linked driver arms: i.e., a first arm A-L (connected to P-L through a similar oversized slot connection and pivoted at pv' from the machine frame), plus a second arm AA pinned pivotingly, in a prescribed manner to the periphery of hub H on one end and also pivotally connected to an intermediate section of arm A-L. Arms A-L, AA are adapted, as described below, to thrust plunger P-L upward from a prescribed "rest position" (shown in FIG. 15A) to a prescribed "actuated position" (shown in FIG. 15C, being indicated as "semi-actuated" in FIG. 18), given the corresponding degree of rotation by hub H. It is returned to "rest position", in like manner, upon reverse rotation of hub H. Between these two positions, according to this construction, plunger P-L assumes an intermediate quiescent or "cocked", condition, as indicated in FIG. 15B, during which it is poised to begin its full actuation-thrust, once the upper plunger P-U has completed its thrust—therebeing a predetermined delay in sequencing of the two thrusting actions, preferably, in order to better strip by pinning one pack-portion before stripping the other portion away. Oversized guide slots g-u, g-l are provided for P-U and P-L, respectively, for loosely directing the excursion-travel (path) of both plungers, as known in the art.

The construction and operation of this opposed plunger rotary drive mechanism will be generally understood by those skilled in the art, but further appreciated from the following explanation of a typical "double-diverting" sequence. Hub H and start marker SM thereon will be understood as rotated in the "actuate direction" (see arrow in FIG. 15A) from a "rest condition" (with marker SM aligned along Start Radius $R_o$) the rotated a prescribed amount $aa°$ sufficient for P-U to complete pack-deflection downward (as in FIG. 15B, preferably pinning P-U against a fixed surface, like guide g-l), and, lastly, H is further rotated a prescribed amount $bb°$, from $R_1$ to $R_2$, sufficient to complete pack-deflection upward by P-L (as in FIG. 15C); P-U being left "grounded" in its prior condition. (Note marker SM is rotated further to be aligned along radius $R_2$, having been swept through a total arc sector of $cc° = aa° + bb°$; preferably $aa = bb = 22.5°$). Hub H preferably operates two pairs of up/down plungers (through the linkage, etc., is only recited with respect to one pair, below).

The plunger array and hub H will be held in this "double-partitioning" condition while all transducer operations are performed on the selected disk. Then it will be "released" to terminate pack partition, allowing return to "rest condition" (FIG. 15A). Actuation (partition) rotation may be effected by well known means such as rotary solenoid means (not illustrated). Similarly, "released-rotation" (i.e., return) may likewise be implemented with known means (e.g., by a spring return, or alternatively a solenoid-return, both well known in the art and not illustrated). This return will rotate hub H from the condition in FIG. 15C back to the "rest condition" FIG. 15A), through first retracting lower plunger P-L from the pack (FIG. 15B) then, upon further rotation, thewhile reverse-rotating arm A-U and retracting attached upper plunger P-U with it, with cam wedge CR pushing A-U as known in the art. Workers will conceive other like rotary drives for synchronously driving a pair of plungers opposingly, according to this feature.

In FIG. 18 a similar arrangement is shown wherein a similar flexible disk pack PK will be understood as adapted to be similarly "doubly partitioned". Here, a lower plunger PL will be understood as deflecting an upper portion, PK-U, of the pack (shown part-way deflected) away from the selected disk, D-S, while a companion upper plunger PU is actuated to oppositely deflect the lower portion PK-L of the pack. Disk D-S will be understood as positioned to be registered with (upper and lower) transducer portions of an associated double-transducer arrangement TR, shown here as poised for injection in the pack so as to envelope disk D-S. This is further described below.

The plunger actuation mechanism here will be understood as generally the same as described above (FIG. 15), being driven from a rotary hub H, to which are attached the linkage for driving the lower plunger P-L (arms A-L, AA-L linking P-L with hub H as before) and the upper plunger P-U (arm A-U resiliently coupled via spring SP to follow hub H in one direction and to be reverse-rotated by a cam-detent CR, as before). Similarly, a set of guides g-u, g-l are also provided for the upper and lower plungers, respectively, as before.

Workers in the art will appreciate the simplicity and reliability of such a "double plunger/rotary actuation" mechanism and will visualize other similar mechanisms for actuating such opposed pairs of plungers.

Double Plungers (FIGS. 16, 17)

As mentioned above, it will, at times, be desirable for the partitioning arrangement to also "hold" the selected disk "centered" during "double-partitioning". Thus, while deflecting the flexible pack away from both sides of the selected disk the partition arrangement will maintain that disk centered along a prescribed reference plane. Partitioning will be sufficient to admit an "enveloping transducer array" (cf. bifurcated array TR in FIG. 18, further discussed below) adapted for Reading/Writing operations on both sides of the selected disk, as desired. The opposed plunger array for such "double-partitioning" has been described above, but workers will naturally be concerned over methods for driving such a plunger array "through" the selected disk. Also, workers will recognize that it is difficult in the extreme to visualize a practical system for "centering" the selected disk, i.e., maintaining the floppy recording disk relatively fixed along a reference plane for constant-path access by transducer TR.

According to another feature, the present invention provides a solution to both problems, as illustrated schematically in FIG. 17 C, whereby at least one pair of opposed bi-part plungers, are to be understood as adapted both for "centering" and for "double-partitioning".

Partition hole patterns will be designed for such disks as contemplated by workers in the art, which will permit the bi-part plungers to be used on both sides of a flexible disk pack to implement these two-fold objectives, separating and isolating a single selected disk. A preferred bi-part plunger construction is shown in FIG. 17 according to this feature.

Thus, in FIG. 17C, a flexible disk pack will be understood as "doubly partitioned", with upper and lower pack portions deflected away from an intermediate selected disk D-S by at least one pair of opposed telescoping-double, upper and lower plungers one such bi-part plunger array, is shown in FIGS. 17A, 17B. The mounting of the pack, the access and arrangements of the transducer means and the actuation and control of the plunger assemblies will be understood as conventional in the art and/or as described before, and need not be detailed here. Similarly, while only one pair of opposed double-telescoping plungers is postulated here, workers will appreciate that a second pair (and possibly other pairs) may be added as desired to effect an extended, more reliable partitioning.

Each double-telescoping plunger assembly comprises an outer, relatively hollow cylinder PO-B in which is (telescopically) coaxially nested, an inner smaller plunger (e.g., inner plunger P-1B nested inside outer plunger P-OB) The outer plunger PO-B will be seen as "holding" selected disk D-S in position, while the projectable inner plunger P-1B deflects one-half of the pack (here, the upper half PK-U). PO-B operates to be thrust (by linkage PA-a, PA) through a guide g as before, being T-based preferably to retain it in the guide. Inner plunger P-1B is preferably spring-coupled to outer plunger P-OB and T-headed for driving.

The flexible disks are arranged to accommodate such operations having two kinds of plunger apertures; a relatively wide "primary" partition-aperture adapted, positioned and dimensioned to accommodate the outer plunger (e.g., as indicated in upper and lower pack sections PK-U, PK-L respectively in FIG. 17C); plus a "secondary", relatively narrow partition hole adapted to block the insertion of the outer plungers and to pass only the narrower inner plungers [as illustrated for selected disk D-S in FIG. 17]. As workers will recognize, the above-described patterns of partition-holes must be modified to accommodate these two kinds of primary and secondary partition holes. This may be done readily as workers will see.

Dimensionally speaking, the outer plunger tip and associated linkage, will, of course, be arranged to coincide with the mentioned "operating plane" (position of selected disk and area to be enveloped by inserted bifurcated transducer array). According to a feature hereof, this operating plane will, preferably, be the same, within limits, and will not vary according to whether the "selected" disk is in the top, center or bottom of the pack. This obviously is a tremendous advantage and simplification over convential designs where the transducer assembly must "hunt" vertically to be registered with a selected disk.

Workers will, of course, conceive of other like bi-part plunger designs. One such is shown schematically in FIG. 23 as a more T-shaped pin PP with an enlarged head 7 (for actuator-coupling) and an enlarged disk-positioning annulus 3 intermediate the proximate and distal pin segments (5, 1, respectively).

A like alternative plunger concentration is depicted schematically in FIG. 17C where a related, opposed pair of bi-part bi-functional plungers is shown cooperating to deflect a pack in a double-partition mode, while holding the intermediate selected disk D-S in prescribed position. Each plunger comprises an enlarged-diameter proximate pin (UPO-2, LPO-2—these holding D-S positioned for transducer access) and a reduced-diameter distal pin mounted on the proximate pin and projected there-beyond sufficient to effect the associated pack-deflection (UPI-2, LPI-2). Then plungers are actuated conventionally (through guides g, as before) and are separated (d) sufficient to inhibit excessive "droop" of the intermediate disk-section. Such a plunger pair will be separated from a companion plunger pair (e.g., see FIG. 16) sufficient at least to admit the transducer array. The extended length of the projecting inner plunger pins (e.g., UPI-2, LPI-2) will, in general, be the same and will correspond to the maximum clearance needed for the transducer entry on that respective side of the selected disk. Of course, as described elsewhere, once such an entry has been made, the preferred form of transducer, with its covering shield, may quite readily be further thrust to further deflect the pack away from the selected disk as desired. The distance "d" (FIG. 17) between plungers will, of course, be determined by the stiffness of the disk material, by the head/disk clearance of the transducer array as first injected and by other related factors. For instance, in certain cases a certain amount of "droop" between opposed positioning outer plungers may be tolerated so long as the transducer design and positioning means allow (including positioning tolerances axially of the pack etc.). And, at times, the center-hold plunger means may even be dispensed with (e.g., where the stiffness of the "selected" disk will keep it sufficiently "self-centered" so the transducer array can register with it).

Of course, while such an opposed telescoping plunger arrangement has been depicted as very apt for the double side, "forked" type transducer assembly, workers in the art will visualize other instances where it may be used to advantage; such as where two independent opposed (upper and lower) transducer arrays are to be independently inserted selectively (alone or together) above and/or below a selected disk which is held in position by such a partitioning arrangement.

Transducer Array (FIGS. 18–22)

FIGS. 18 through 22 show a novel bifurcated mount TR (or double-sided "clothes-pin" like transducer array) comprising an opposed pair of identical shield/transducer combinations according to another feature. Assembly TR was briefly mentioned above and will be generally understood, (see FIGS. 18 and 19) as arranged and controlled to be translated (by a known type linear actuator unit LA) from an outer, "retracted" position (FIG. 18) into the flexible disk pack PK once the pack has been "doubly partitioned" (at least partially). Array TR will be translated by linear actuator unit LA and driving-arm LA-a in a relatively known controlled manner to present the upper and lower shield/transducer combination so they may operate transducingly on the upper and lower recording surfaces of the selected intermediate disk (see disk D-S). Array TR will be so translated to follow a prescribed constant "TR-path" (along a prescribed plane), leaving intermediate disk D-S undisturbed and "just out of contact" with the upper and lower transducer means, but closely adjacent thereto. Disk D-S (and the rest of pack PK) is concurrently rotated at transducing velocity, beginning shortly after the shields S make contact with the (upper and lower pack portions) and the partition plungers are withdrawn, as described above. (The transducer actuation and transducing operations and related controls, etc., will be understood as conventional in design and operation except as otherwise described herein).

Workers will understand that head mounting/retracting means are provided, according to another feature, so the opposed heads will be automatically thrust onto the disk when the transducer array approaches the outermost recording tracks, and to be automatically retracted out of disk contact when the array is withdrawn from the pack. Each head is, preferably, mounted on a flexure-gimbal like gimbal fg, in FIGS. 19, 21. Gimbals fg are supported by relatively short (1–1.5 inch) flexure bars fa which serve to provide the light "running load" (several grams) under head/disk contact when thrust by flexure arms ha. Gimbal fg includes an "ear" t adapted to be engaged by flexure retracting lever ha, adapted to lift the head assembly and retract it into the confines of the shield automatically, upon withdrawal of the transducer array from the pack. Each lever ha is so raised by cam-engagement with roller-cam RL pivoting lever ha-L up against an associated guide surface g-1 of the respective shield—when, during TR retraction, a "bent" section (ha-L') passes over RL. Then, once the head assembly is drawn up against its shield, and held there, along with the companion opposing head assembly or the other side of the disk, will thus be "spread-apart" in "disengaged mode" and retracted into its shield. The separation of head assemblies etc., in this "disengaged mode" will be sufficient to define a prescribed intermediate "entry-plane" in which a selected disk must be "held" (as above mentioned). Insertion of the bifurcated transducer array will reverse the above sequence, with (both) levers ha dropping off the common cam roller RL to thrust the head assemblies together, squeezing lightly against an intermediate disk.

Thus, initially, once pack PK is doubly partitioned, (as illustrated in FIG. 18, etc., at least sufficient for entry of the array TR) the translation unit LA, and associated control means, will be conventionally operated to begin thrusting the distal ends of array TR into the confines of the pack, the while enveloping the intermediate selected disk D-S, non-contactingly. Soon thereafter, the partitioning plungers are withdrawn (these are preferably affixed flanking array TR separated enough to allow this partial entry). This allows the upper/lower pack portions PK-U, PK-L to collapse upon their respective adjacent shields S-U, S-L, respectively. The pack may then be rotated, with these deflected portions being gently guided over the associated shield S as they are swept past the transducer array (as described above). Array TR will continue to be thrust into the pack until its transducer heads (upper or lower) register with a target (initial) recording track on disk D-S (i.e., the one scheduled for initial transducing operations), with shields S continuing to deflect the flanking pack portions PK away from disk D-S, thus protecting the transducer heads nestled protected, under each shield (as described below).

Here, reference may be made to FIG. 22 for a selectively schematized illustration of this actuator-transducer array (LA, TR) in operative relation with a jacket-enclosed disk pack (upper half PK-U shown) and selected partition plungers (one associated opposed pair P-U', P-L') in a disk drive M. The plungers are arranged to be driven in common (two pair) by rotary actuator H, with a linkage UC connecting both upper-plunger driver arms A-U, A-U' to be actuated in common by H (lower actuate arms A-L, A-L' being similarly driven in common; linkage not shown). The pack (within its jacket) will be understood as conventionally inserted through door E into drive unit M to be mounted for rotation on a turntable (see spindle-hub T-S) and otherwise manipulated as elsewhere described and as known in the art.

Thus, array TR will be understood (see FIGS. 19, 21, especially) as also adapted to carry an opposed pair of upper and lower transducer heads h-u, h-l, respectively, these, being held out of engagement with disk D-S (e.g. on respective flexure cantilever arms ha-U, ha-L) until one or both of the heads is registered with the outermost track on D-S—as TR enters the pack.

Then heads h will be understood as automatically dropped into "squeezing engagement" with intermediate disk D-S (e.g., when arms ha pass beyond cam-roll RL) as seen in FIG. 19, according to another feature hereof. Once in contact with disk D-S, it will be apparent that the heads are adapted and arranged to provide a pair of "offset opposed" transducer/contact pad assemblies; this design eliminating need for a fixed contact pad for either head and allowing both assemblies to squeeze the flexible disk so as to dynamically "follow" it in relatively close transducing engagement despite minor perturbations therein.

Preferably, according to this feature, the heads are "u-shaped"; identical and mounted in opposition so that the transducer of each one is biased (by flexure arm ha) against the contact-pad section of the other, lightly squeezing the intermediate disk. Such heads and such transducer design (including hooded shields S-U, S-L, etc.) will be appreciated as particularly apt for use with "biased-flexure/cam-retracted" mountings taught according to this feature. Such a mounting provides an elongate bent-flexure arm ha pivoted, at ha-p, at one end from the shield to normally engage the head mounted with its distal end to thrust it resiliently against an intermediate disk with prescribed force (here, a few grams preferably). Each shield is constructed to include a "v-shaped" guide surface g-l adapted to engage the respective bent mounting flexure and conform thereto when the flexure is retracted, holding the head h retracted within the shield protectively, (as suggested in FIG. 18). Diverting means such as cam roll RL, are affixed on the drive, and positioned so that as transducer TR is retracted away from pack PK and the heads pass beyond the perimeter of the disks, the flexure arms ha will be thrust back against guides g-1 automatically and held there—being released, of course, upon reversal of actuator LA (when driving TR back toward the pack) to automatically drop the heads upon an intermediate disk when it begins to pass between them.

Each bi-part head h (see also FIG. 21, a plan view) is preferably mounted to be projected normally against disk D-S on a flexure-gimbal fg mounted on a u-shaped flexure-bar fa cantilevered-out from its respective shield as known in the art. Each such head-mount is preferably selectively engaged for retraction by its respective retractor arm ha via a tab t, projected from bar fa so as to be normally engaged by the distal end of the arm ha, when ha has been released by cam RL, to thrust the head against disk D-S. Workers will appreciate that it is relatively simple to provide such a tab, or like connector, and to mount each flexure arm ha to normally assume this head-biasing condition unless retracted (by cam roll RL or the like). And workers will contemplate other similar "biased-flexure/cam retracted" mounting according to this feature.

Stabilizer/cleaner Means

According to a related feature, a pair of opposed upper/lower stabilizer-cleaner means, (preferably brushes, b-u, b-l or the like) are also provided in assembly TR, each preferably mounted on respective shields S-U, S-L.

Workers will recognize certain problems in assuring the proper stability and cleanliness of flexible media, like magnetic tape and the above described floppy disks. For example, in the "contact recording" modes contemplated here, one finds that various kinds of recording heads tend to become "dirty" within just a few hours of use. This often takes the form of "dust" from the magnetic tape collecting on the head. Such debris can readily cause separation loss and can induce erosion of the media. Such debris can cause temporary data-loss ("dropouts") due to transient spacinglosses (as particles get between head and medium). Such problems have caused workers to shut-down a recording system (e.g., a magnetic tape drive) and engage service personnel to clean the head or replace it. As workers well recognize, such interruptions are very undesirable and can be quite costly, whether they involve a few minutes or a few hours.

Obviously such debris should be eliminated or quickly collected. Some workers have tried to solve such problems. For instance, in U.S. Pat. No. 3,964,104, a rather simple arrangement of brushes is suggested for cleaning head surfaces (not media, though). But such expedients will not be found very satisfactory for transducer arrays like the above described mount. This not only because their cleaning efficiency is questionable, but especially because they characteristically ignore the concomitant problem of "medium stability". This invention provides a solution, teaching the provision of means associated with flexible disks or the like, whereby the associated transducer mount is adapted to stabilize the medium as well as clean its surface, doing so just prior to engagement with the transducer gap. This means is disposed to engage the disk surface just upstream of its associated transducer head and is thus adapted to clean and stabilize the flexible disk section just before it passes under the head (as further described below). More particularly, a shield like the above described may, preferably, be adapted to not only divert an associated portion of the pack (as described above), but is further adapted to protect (and, preferably, also provide a mounting base for) an associated transducer head, its mount and related stabilizer/cleaner means.

Such a cleaner/stabilizer means may comprise a brush or mat arranged in predescribed manner on the transducer mount. Alternatively it may be a self-indexing tape, etc., as mentioned below.

In a preferred embodiment, depicted more fully in FIG. 20, a (lower) shield S-L is shown as configured similar to a "conic section" on which is mounted a stabilizer/cleaner brush b-1 and an associated transducer head h-1. Head h-1 is disposed on the free, distal end of an associated flexure gimbal (as described above), understood as disposing head h-1 on disk D-1 "downstream" of brush b-1, (when h-1 is exposed for disk-engagement as mentioned above), so that b-1 "cleans" and "stabilizes" the floppy medium just prior to transducing.

Stabilizer-cleaner brushes b-1, b-u, will be understood as relatively identical in design and operation. In this embodiment they preferably comprise a nylon brush or like "wiper-collector", adapted upon opposed, "squeezing" engagement with a disk, to clean it free of any grit, dust and other surface debris which might interfere with optimum transducing—as well as to stabilize the disk, mechanically, against flutter, etc., (that may similarly interfere with optimal transducing)—doing this immediately before the disk engages the associated recording head! That is, such a squeezing force will serve to stabilize the stream just upstream of the head assembly and will eliminate any axial, out-of-plane variation as well as collecting any loose media fragments and extraneous debris. Preferably, the brushes are made easily accessible and cleanable as well as replaceable.

Workers will perceive how such brushes, etc., can be optimized. For example, they may be operated to "wipe" the medium—doing so obliquely, where appropriate, so as to create a lateral "brushing action". Also, they may be arranged to engage the medium only periodically, thus imparting something of a "scrubbing action", while also minimizing the risk of significant heat generation. Thus, brush engagement may be periodic (rather than continual); e.g., when the transducer mount (shield) first engages a disk. A vacuum may also be applied in the area of medium cleaning to withdraw debris.

Alternatively the brush may comprise a "velveteen mat" or like felt material that would similarly clean and stabilize the flexible diaphragm, once thrust against it, under a small (e.g., several gram load). As with the heads, h, the opposed brushes b are thrust, squeezingly, with equal force against disk D-S from both sides, as indicated schematically in FIG. 19.

Upon retraction of transducer array TR, the brushes may be cleaned. With a "velveteen", or like felt, the material may take the form of a self-feeding tape (like a typewriter ribbon) adapted to be "self-indexing" and "self-cleaning", presenting a new clean area adjacent the disk periodically (e.g., each time it is first engaged by the pack). Workers will recognize that such material may be much like the soft, absorbent liners that are used in flexible disk pack jackets, being adapted to capture grit, etc., pieces which can indent a flexible disk damagingly and so forth.

Workers will recognize that such a stabilizing/cleaning action will be beneficial, especially when operating squeezingly with the opposed stabilizer/cleaner means and opposed downstream heads applied to gently squeeze the intermediate flexible disk section as described. Thus, such an arrangement of opposed stabilizer/cleaners and related opposed offset transducer/contact pad means, will be recognized as, together, providing an unusual, surprisingly beneficial improvement for "double side" transducing, giving superior performance as well as eliminating the conventional pressure pad and any extraneous cleaning and/or stabilizing means.

FIG. 21 indicates in schematic plan view, the lower shield S-L and associated elements arranged just out transducing engagement with a selected disk (not shown) and with the pack-half deflected by shield S-L, shown in phantom at PK-L. On shield S-L are mounted an associated lower stabilizer/cleaner brush b-L and lower head/contact pad assembly h-L, head h-L being shown mounted on flexure bar fa and gimbal fg, with pivotable flexure arm ha-p indicated engaged with tab t on bar fa so as to be able to retract the head assembly (here retracted). The entire array is depicted as coupled to linear actuator unit LA, via arm LA-A as known in the art. Flanking the described shield-transducer array are the above mentioned plunger actuator H and associated linkage A-U, A-L. This flexure mounting will be adapted to provide the mentioned light loading and "squeezing action", pressing the opposed heads h-u, h-l, against the intermediate flexible disk D-S just enough to provide good transducing engagement (pad contact) therewith, as well as to further stabilize the intermediate disk section, etc.

Of course, alternative configurations may be contemplated to provide the same or similar advantages and features above mentioned. For instance, it will not always be necessary or advisable to mount the shields and head mounts to be co-translated into and out of the pack. In certain instances they may be separately translated, for instance, with the shields, thrust fully-into the pack (by a first translate means to accommodate transducing on the innermost disk track), while the head mounts are (separately or conjunctively) translated by other means to engage respective upper and lower tracks independently of shield position. This would sacrifice some convenience in construction and operation mechanism as well as compromising simplicity and a certain amount of effectiveness, as opposed to the above described embodiment.

While the described disk media are well suited for application of this invention, workers will recognize that other applications are also feasible; for instance, other "partition-apertured" disk packs; such as the "single-hole pattern" type illustrated and described in co-pending commonly-assigned U.S. patent application Ser. No. 766,288, filed Feb. 7, 1977, entitled "Improved Partitionable Disk Pack"; and herewith incorporated by reference to the extent relevant.

Conclusion

In summary, workers in the art will recognize that the foregoing described embodiments are well adapted to provide novel, unobvious improvements in manipulating multi-disk media—especially flexible disks—with improved pack-partitioning and transducing arrangements according to the invention. Workers will also recognize that, while a particular disk handling embodiment has been described, for clarity of illustration, other related disk handling arrangements and/or media are contemplated, especially where "double-sided" transducing and associated pack-partitioning is desired.

For instance, workers will recognize that, instead of the described partitioning means operating about the circumferential periphery of the disk pack, a like arrangement may be provided to operate closer to the center of the pack, such as upon encoded holes arranged about an inner disk track. That is, a series of hole-encoded collars may be substituted (with no hole-encoding of the disks), each supporting a respective disk in a pack and removably coupled (e.g., by key-way means) to a common hub, or spindle, with a similar plunger means being arranged to be thrust up through this stack of collars and deflect (upward) those "above" a given selected disk. Such an arrangement may be more apt for rigid disks.

Moreover, whereas the illustrative partitioning means are mechanical, it will be apparent that alternate means such as pneumatic or hydraulic partitioning means will in certain cases also serve. For instance, one could substitute a gas injection tube for the mechanical plunger of the indicated partitioning arrangement and propel a burst of pressurized gas up through a selected registered group of locator-holes, as understood and appreciated by workers, under proper circumstances to (at least partially) partition the pack sufficient to allow transducer entry—in certain cases this will even reduce associated abrasion and defacement of disk surfaces, as well as accelerating partitioning. One can introduce pressurized gas from inside a spindle hub adjacent the partitioning plane to be propelled radially-out. Thus, in case the disks are not rigid enough at their periphery once their hubs are raised to the reference plane, application of a stream of pressurized gas can then proceed radially out to maintain them raised. Then, once the head enters and the turntable begins to spin, much less gas pressure would probably be required to maintain them in position above the partitioning plane where desired—especially where this is used in conjunction with a supporting shroud.

Further, in certain cases partitioning may be effected without completely arresting the rotating disk pack (e.g., while quickly incrementing the pack in digital, stepped fashion between R/W rotation sequences). Workers will also realize that various other accessory means may also be employed and that the described means may be modified. For instance, in certain instances it will be desireable to operate the disk drive so as to match the incremented "stop" positions of the (digital) turntable drive (preferably a known rotary stepper-motor, digitally controlled) relatively closely to the rotary partition positions—in which case the turntable spindle will be appropriately coupled to the drive motor to effectuate this (e.g., with a belt coupling the spindle and motor gears in approximately a 1:1 ratio).

With the preferred embodiments of the invention thus described in detail, those skilled in the art will be able to contemplate certain modifications in structure and/or method over that illustrated and described, and/or contemplate the substitution of equivalent elements for some or all of those disclosed, while nonetheless practicing the novel concepts described and claimed herein; accordingly, it is intended that all such modifications and substitutions be embraced insofar as they fall within the spirit and scope of the appended claims.

What is claimed is:

1. In combination:

a partitionable, flexible disk pack comprising a stack of disks, each disk having an encoded arrangement of partition apertures and being arrayed in the stack so that predetermined apertures are registered from disk-to-disk, thereby generating at least two sets of "partition bores", each set originating from an opposite respective end of the stack and comprising bores of varying depths distributed circumferentially about the stack to terminate uniquely at a different respective disk surface; drive means adapted to rotate the stack; and improved double-partitioning/centering means adapted to project at least one pair of thrust forces opposingly, to effect an "end-wise partitioning", axially of the stack and normal to a major surface of the disks, each force being directed against a selected disk surface from an opposite respective end of the stack and adpated to be applied through at least a selected one of the bores in the associated bore set when the stack is rotated to register this bore with this force, and impacting the associated terminating disk-surface deflectingly whereby to partition the stack and open a gap adjacent this surface;

said partitioning/centering means thus being adapted to so deflect the disks divergingly as to define a partition-gap as well as to "center" the "selected" disk diposed in this gap intermediate the impacted disk;

said drive means being arranged and controlled to accommodate this partitioning.

2. The combination as recited in claim 1, wherein said partitioning means is further adapted to "hold" the selected disk positioned for engagement with associated "double-sided" transducer means.

3. The combination as recited in claim 1, wherein said disk apertures are arranged in two patterns, a first partition-aperture pattern adapted to enable the partitioning action and a second centering-aperture pattern adapted to enable associated centering action.

4. The combination as recited in claim 1, wherein said partitioning means comprises at least one pair of opposed plunger means, each plunger means comprising an outer partitioning-shaft and an inner centering-shaft, the centering-shaft being adapted and arranged to be projected, beyond the end of the outer shaft and so cooperate in effecting the centering action.

5. The combination as recited in claim 4, wherein said disk apertures comprise at least two first sets of relatively large partition-holes adapted to pass said outer shaft and at least two second sets of lesser-diameter centering-holes adapted to pass said centering-shafts;

the disks being stacked so as to generate an associated first and second set of large and small "up-bores" and an associated first and second set of "down-bores";

each inner centering-shaft being mounted telescopically within the associated outer partitioning shaft and adapted to be projected therebeyond, when fully actuated, sufficient to establish about one-half of the contemplated partition gap.

6. The combination as recited in claim 1, comprising at least one pair of opposed plunger means adapted to be actuated to thrust respective plunger shafts opposingly toward one another in a prescribed manner;

and also including common actuator means coupled to each pair of plunger means and adapted to effect said opposed actuation in prescribed synchronism.

7. The combination as recited in claim 6, wherein said common actuator means is adapted to sequence the thrusting of the shafts so as to more readily "strip-apart" adjacent disks at the partition site and comprises rotary hub means and first and second coupling means arranged to couple said hub means to respective first and second plunger means for controlled reciprocation thereof.

8. The combination as recited in claim 7, wherein each actuator means comprises a rotatable hub rotatably mounted on a given hub-shaft;

first linkage means coupled between the hub and at least one first plunger means for thrusting thereof, given a rotation of the hub;

and second linkage means coupled resiliently to said hub and pivotably to actuate at least one second plunger means;

and mounted in common upon said hub-shaft, said hub including return means adapted to return said second linkage and so retract said second plunger means, which resiliently follows said hub for actuation thereof.

9. The combination as recited in claim 8, wherein said first linkage means comprises an actuator arm pinned to said hub and said second linkage means comprises an actuator bar mounted on an axis in common with said hub, and adjacent thereto, being coupled therewith for co-rotation thereby;

said first linkage means being adapted to reciprocally pivot an arm connected to the associated plunger shaft; and said second linkage bar being spring-coupled to said hub for rotation thereby in a first direction and also being adapted for engagement by a cam on said hub for return, oppositely to the first direction.

10. The combination as recited in claim 6, wherein the double partitioning/centering means are adapted for insertion of a two-sided transducer array into the partition gap, the plungers being adapted to maintain the selected disk centered and fixed in position for engagement on either, or both, sides by this transducer array.

11. The combination as recited in claim 10, wherein each plunger means comprises at least one pair of opposed plunger means, each plunger means comprising an outer partitioning-shaft and an inner centering-shaft, the centering-shaft being adapted and arranged to be projected, telescopically, beyond the end of the outer shaft and so cooperate in effecting the centering action.

12. The combination as recited in claim 9, wherein the disk apertures comprise at least two first sets of relatively large partition-holes adapted to pass said outer shaft and at least two second sets of lesser-diameter centering-holes adapted to pass said centering-shafts;

the disks being stacked so as to generate an associated first and second set of large and small "up-bores" and an associated first and second set of "down-bores";

each plunger means comprising at least one pair of opposed plunger means and including an outer partitioning-shaft and an inner centering-shaft, the centering-shaft being adapted and arranged to be projected, telescopically, beyond the end of the outer shaft and so cooperate in effecting the centering action;

said disks comprising flexible magnetic data records.

13. The invention in accordance with claim 1, wherein said partitioning means provides said thrust forces at certain prescribed pack-rotation positions;

and wherein disk pack rotating means are included and controlled for rotating said stack to these selectable angular positions such that selected bores associated with partitioning for a selected disk are rotated to an angular position registering with respective partition force and thus adapted to pass said thrusting force to be applied against a disk adjacent said selected disk.

14. The invention in accordance with claim 13, wherein the apertures in each bore-set comprise holes spaced along a circumferential track, the disks having identical hole patterns, but stacked with each disk rotated relative to the underlying disk by a prescribed angular amount whereby to effect said bore patterns.

15. The invention in accordance with claim 1, wherein said partitioning means includes at least one pair of opposed plunger means selectably disposeable at, and directable into, a selected one of the bore sites in the corresponding bore pattern, each plunger means being operable to pass through a selected one of said unobstructed bores and thereby couple a thrust force to deflect corresponding disks and so partition the stack;

wherein are included means for rotating said stack to selectable angular positions such that any selected one of the bores in each set is rotated to an angular position for registering with an associated plunger for passage thereof upon activation;

said encoded arrangement of apertures provided on said disks being so made and the disks so stacked such as to present two opposing sets of partition-bores, each set comprising bores provided to respective successive disks from one respective end of the stack and disposed at respective unique angular position along a common circumferential track; and wherein said thrust forces include a pair of opposed plunger arrays, each located in a fixed position adjacent a respective end of the stack and being movable toward the stack in a direction intersecting the track of said bores in an actuated-excursion sufficient to deflect all the disks in the stack.

16. A method of providing for the selective partitioning of a stack of co-rotatable flexible record disks, said method comprising:

arranging a partitionable, flexible disk pack to comprise a stack of disks with each disk having an encoded arrangement of partition apertures;

stacking said flexible disks to form a disk pack with inner portions of said disks retained together to form the stack while permitting it to be flexed open between any selected pair of adjacent disks;

this stacking being arranged so that predetermined disk apertures are registered with corresponding apertures of the other stacked disks to thereby generate at least two opposed sets of partition-bores, each set originating from an opposite respective end of the stack and comprising bores of varying depths distributed circumferentially about the stack to terminate uniquely at a respective disk surface;

said stack being selected and arranged so that each set of apertures in said disks are located along a common outer circumferential track of said stack, with each bore in each set disposed at a unique angular position along the common track;

rotating said stack to a selected one of said unique angular position to register a corresponding bore with the associated partitioning means and thus accommodate this partitioning; and partitioning said stack by directing thrusting forces into a selected bore in each set so as to deflect, divergently, at least the two disks adjacent a "selected disk".

17. The invention in accordance with claim 16, wherein the disks are selected and arranged so that each has an identical aperture pattern and is stacked relative to the adjacent disk so as to be angularly shifted by a prescribed "mis-registry angle", thereby generating at least one opposed pair of said bore sets.

18. The combination as recited in claim 16, wherein at least one pair of multi-partitioning/centering means adapted to direct at least one pair of opposed thrust forces is provided, each means being adapted to direct deflection force against the disk surfaces from a respective end of the stack and adapted to be applied through a selected one of the bores in the associated bore set when the stack is rotated to register this bore with this force, the force being adapted to deflect and partition the stack at the plane of the terminating-disk;

and operating these partitioning means so as to partition the pack, deflecting adjacent disks divergingly to define a partition-gap as well as to "center" the intermediate "selected" disk disposed in this gap.

* * * * *

UNITED STATES PATENT OFFICE
CERTIFICATE OF CORRECTION

Patent No. 4,129,891      Dated December 12, 1978

Inventor(s) Herbert U. Ragle and Dean DeMoss

It is certified that error appears in the above-identified patent and that said Letters Patent are hereby corrected as shown below:

Col. 6, line 18, change "as" to —a—.
Col. 11, line 58, change "upplungers" to —up-plungers—.
Col. 13, line 53, change "known" to —know—.
Col. 15, line 19, change "the" to —then—;
        line 66, change "FIG." to —FIGS.—.
Col. 16, line 49, after "plungers" insert —.—;
        change "one" to —One—.
Col. 20, line 58, change "spacinglosses" to —spacing-losses—.

Signed and Sealed this

Seventeenth Day of April 1979

[SEAL]

Attest:

RUTH C. MASON
*Attesting Officer*

DONALD W. BANNER
*Commissioner of Patents and Trademarks*